(12) United States Patent
Gilliam et al.

(10) Patent No.: US 12,099,563 B2
(45) Date of Patent: Sep. 24, 2024

(54) ON-DEVICE FUNCTIONALITY USING REMOTE SYSTEM UPDATES

(71) Applicant: Branch Metrics, Inc., Redwood City, CA (US)

(72) Inventors: Charles Gilliam, Seattle, WA (US); Eric J. Glover, Chappaqua, NY (US); Jonas Bauer, Atherton, CA (US); Dmitri Gaskin, San Carlos, CA (US); Nicholas Chen, Lake Forest Park, WA (US); Rishi Khaitan, San Francisco, CA (US); Suvir Jain, Fremont, CA (US); Behdad Aghamirzaei, Sunnyvale, CA (US); Robert Simon, Menlo Park, CA (US); Antonio Garcia-Martinez, Redwood City, CA (US); You Yoon, Houston, TX (US); Christopher Leung, S. San Francisco, CA (US); Lila Strominger, Oakland, CA (US); Deepika Kumar, San Jose, CA (US); Akshay Mahajan, Fremont, CA (US); Jing Du, Santa Clara, CA (US); Benas Klastaitis, Seattle, WA (US); Fabiana Prabhakar, San Carlos, CA (US)

(73) Assignee: Branch Metrics, Inc., Palo Alto, CA (US)

( * ) Notice: Subject to any disclaimer, the term of this patent is extended or adjusted under 35 U.S.C. 154(b) by 262 days.

(21) Appl. No.: 17/402,563

(22) Filed: Aug. 15, 2021

(65) Prior Publication Data

US 2022/0083610 A1 Mar. 17, 2022

Related U.S. Application Data

(60) Provisional application No. 63/161,541, filed on Mar. 16, 2021, provisional application No. 63/068,118, (Continued)

(51) Int. Cl.
*G06F 16/90* (2019.01)
*G06F 11/14* (2006.01)
(Continued)

(52) U.S. Cl.
CPC ......... *G06F 16/954* (2019.01); *G06F 11/142* (2013.01); *G06F 16/9538* (2019.01); *G06F 16/957* (2019.01)

(58) Field of Classification Search
CPC ... G06F 16/954; G06F 16/9538; G06F 16/957
See application file for complete search history.

(56) References Cited

U.S. PATENT DOCUMENTS

| 2016/0188708 | A1* | 6/2016 | Glover | G06F 16/9535 707/722 |
| 2016/0378634 | A1* | 12/2016 | Jovanovic | G06F 11/3409 707/688 |
| 2017/0046436 | A1* | 2/2017 | Glover | G06F 16/283 |

OTHER PUBLICATIONS

"Brave Ads FAQ", On waybackmachine archived on Jun. 20, 2020. Accessed on Jan. 12, 2022 at website: https://web.archive.org/web/20200620153854/https://support.brave.com/hc/en-us/articles/360026361072-Brave-Ads-FAQ.

(Continued)

*Primary Examiner* — Kristopher Andersen
(74) *Attorney, Agent, or Firm* — RMCK Law Group PLC

(57) ABSTRACT

A user device stores a local application including initial search records and an initial search function. Each initial search record includes an application link that opens an application page and search data that describes the application page. The initial search function is configured to select from the initial search records. The user device executes the local application to request and receive search update data from a remote system. The search update data includes updated search records and an updated search function. The user device updates the initial search records and the initial search function with the updated search records and the updated search function. The user device receives a search query from a requesting application, selects a set of updated search records based on the search query and the updated search function, and provides a response to the requesting application including application links from the set of updated search records.

30 Claims, 18 Drawing Sheets

Related U.S. Application Data filed on Aug. 20, 2020, provisional application No. 63/066,576, filed on Aug. 17, 2020.

(51) Int. Cl.
  *G06F 16/9538* (2019.01)
  *G06F 16/954* (2019.01)
  *G06F 16/957* (2019.01)

(56) References Cited

OTHER PUBLICATIONS

"Google launches in Apps", PDF article published Aug. 30, 2016. Accessed on Jan. 12, 2022 at website: https://searchengineland.com/google-in-apps-search-257884.

"How to Use Spotlight Search on Your iPhone or iPad", Article published Sep. 20, 2015. Accessed on Jan. 12, 2022 at website: https://www.howtogeek.com/229060/how-to-use-spotlight-search-on-your-iphone-or-ipad/.

\* cited by examiner

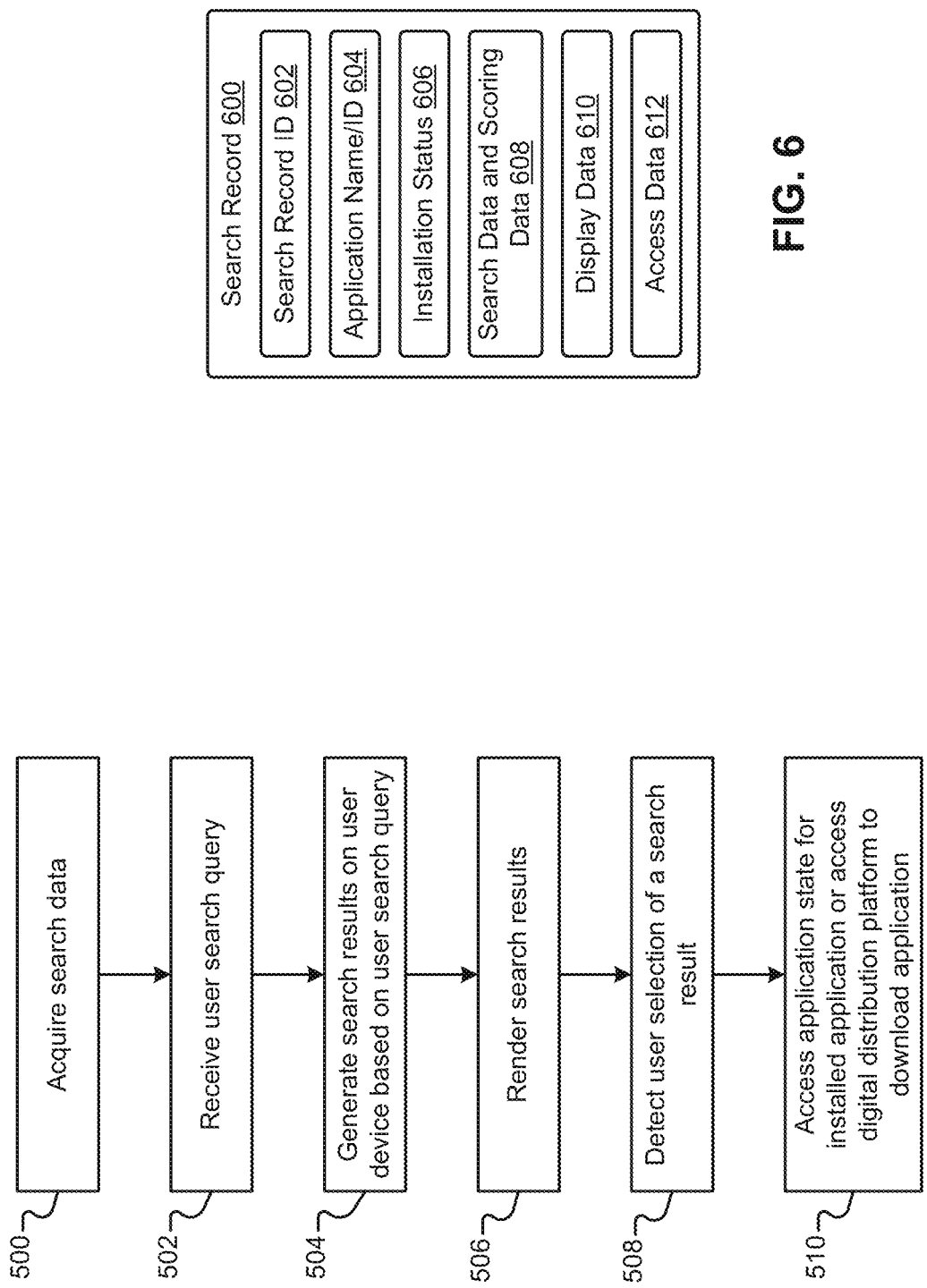

ON-DEVICE FUNCTIONALITY USING REMOTE SYSTEM UPDATES

CROSS-REFERENCE TO RELATED APPLICATIONS

This application claims the benefit of U.S. Provisional Application No. 63/066,576, filed on Aug. 17, 2020; U.S. Provisional Application No. 63/068,118 filed on Aug. 20, 2020; and U.S. Provisional Application No. 63/161,541 filed Mar. 16, 2021. The disclosures of each of the above applications are incorporated herein by reference in their entirety.

FIELD

The present disclosure relates to providing search results, advertisements, and other functions for applications.

BACKGROUND

Software developers can develop websites and applications that are accessed by users on a variety of different platforms, such as different computing devices and operating systems. Example websites/applications may include e-commerce applications, media streaming applications, business review applications, social media applications, and news applications. Website and application search engines can search the websites and applications for a user. For example, a user can enter a search query into a search engine and receive website and application search results for the search query in a search engine results page (SERP). Advertisers, such as application developers and other business entities, may advertise their applications/websites, services, and other products in SERPs across a variety of different computing platforms. In order to efficiently advertise their applications/websites, services, and other products, advertisers may advertise to a targeted audience.

SUMMARY

In one example, a user device comprises memory and a processing unit. The memory is configured to store a local service module application including initial search records and an initial search function. Each initial search record includes an application link that opens an application page. Each initial search record includes search data that describes the application page associated with the initial search record. The initial search function is configured to select from the initial search records. The processing unit is configured to execute the local service module application. Executing the local service module application causes the processing unit to request search update data from a remote system and receive the search update data from the remote system, wherein the search update data includes updated search records and an updated search function for selecting the updated search records. Executing the local service module application causes the processing unit to update the initial search records and the initial search function with the updated search records and the updated search function, respectively. Additionally, the processing unit is configured to receive a search query from a requesting application installed on the user device, select a set of updated search records based on the search query according to the updated search function, and provide a search response to the requesting application. The search response includes application links from the selected set of updated search records.

In one example, a non-transitory computer-readable medium comprises computer-executable instructions that cause a processing unit of a user device to store initial search records and an initial search function. Each initial search record includes an application link that opens an application page. Each initial search record includes search data that describes the application page associated with the initial search record. The initial search function is configured to select from the initial search records. The processing unit is configured to request search update data from a remote system and receive the search update data from the remote system. The search update data includes updated search records and an updated search function for selecting the updated search records. The processing unit is configured to update the initial search records and the initial search function with the updated search records and the updated search function, respectively. The processing unit is configured to receive a search query from a requesting application installed on the user device, select a set of updated search records based on the search query according to the updated search function, and provide a search response to the requesting application. The search response includes application links from the selected set of updated search records.

BRIEF DESCRIPTION OF THE DRAWINGS

The present disclosure will become more fully understood from the detailed description and the accompanying drawings.

FIG. 5 illustrates an example method that describes operation of a local service module that provides local on-device search functionality.

FIG. 6 illustrates an example search record.

In the drawings, reference numbers may be reused to identify similar and/or identical elements.

DETAILED DESCRIPTION

Figure 1:
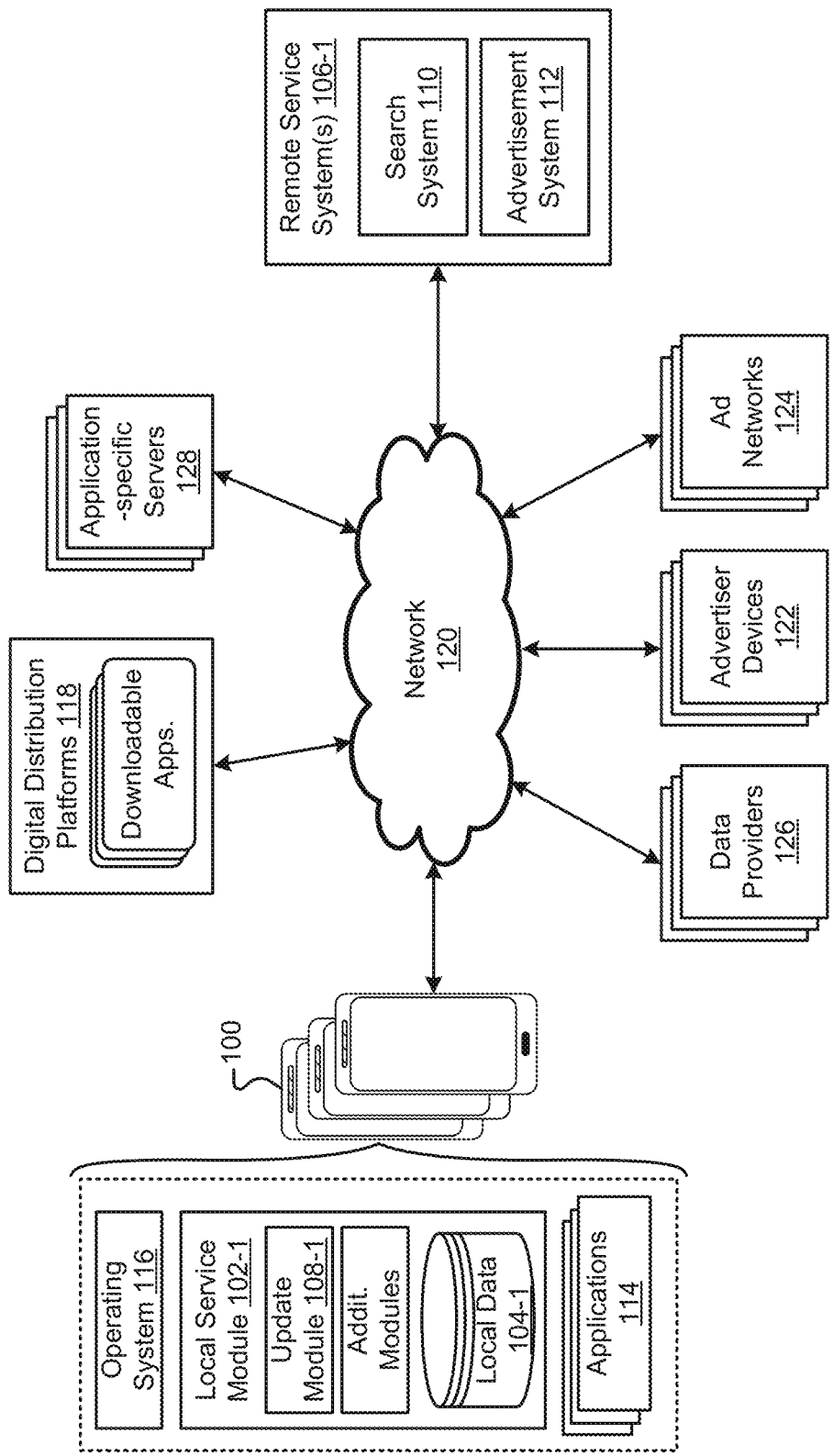
FIG. 1 illustrates an environment that includes user devices that execute a local service module of the present disclosure.

FIG. 1 illustrates an environment including user devices 100 (e.g., smartphones) that execute a local service module 102-1 of the present disclosure. A plurality of example local service modules are illustrated and described herein. The local service modules may be numbered 102-1, 102-2, ..., 102-9, and generally referred to herein as a local service module 102. The local service module 102 may provide one or more local functions for a user device 100. For example, the local service module 102 may provide search functionality, advertising functionality, and other functionality for applications installed on the user device 100. The local service module 102 may include a plurality of modules that provide the various functions attributed to the local service module 102 herein.

In some implementations, the local service module 102 may provide search functionality for an application (e.g., see FIGS. 4A-7). In some implementations, the local service module 102 may provide advertising functionality for applications (e.g., see FIGS. 8A-12). In some implementations, the local service module 102 may provide combinations of functionalities described herein, such as search functionality along with search advertisement functionality (e.g., see FIG. 13). Additional local service module functionality described herein may include, but is not limited to, application intent results, shortcut results, zero state functionality (e.g., zero state links and/or query hints), and autosuggest.

The local service module 102 may use local data 104-1 (generally referred to as "local data 104") to provide local functionality. Local data 104 may include a variety of types of data, which may depend on the types of functionality provided by the local service module 102. For example, local data 104 may include local data used for search, such as a list of installed applications, local search indexes, and/or data indicating application usage on the user device 100. As another example, local data 104 may include data used for advertisements, such as local advertisement content, advertisement targeting parameters, and/or application installation/usage data. In some implementations, local data 104 may include usage data that indicates how the user has interacted with the local service module 102 (e.g., search/advertisement interaction history) and/or other applications.

In some implementations, local data 104 may include raw data on the user device 100, such as a list of installed applications. In some implementations, the local data 104 may include processed data, such as data that is calculated based on the raw data included on the user device 100. For example, the local service module 102 may acquire a contact list stored on the user device and generate a list of abbreviations for the contacts to use for matching during local search. As another example, the local service module 102 may acquire a list of installed applications on the user device 100 and generate a list of abbreviations/acronyms associated with the applications for use in matching during local search. In some implementations, the local data 104 may include data that is received from the remote service system(s) 106-1 (generally referred to as "remote service system(s) 106") and cached in the local data, such as updated search/advertisement data described herein.

The local service module functions may be updateable/reconfigurable. For example, the local service module 102 may update algorithms and data associated with the different functions. In one example, search algorithms (e.g., scoring/selection algorithms) and/or search data (e.g., search indexes) may be updated. In another example, advertisement algorithms (e.g., scoring/selection algorithms) and/or advertisement data (e.g., ad content) may be updated. The local service module 102 may include an update module 108-1 (generally referred to as "update module 108") that acquires updates to the local service module functionality. The update module 108 may acquire the updates from the remote service system(s) 106.

In some implementations, the remote service system(s) 106 may also provide additional remote features/functionality for the local service module 102. For example, the remote service system(s) 106 may provide search/advertisement features for the local service module 102. The remote service system(s) 106 may be referred to herein according to the updates and/or functionality provided by the remote service system(s) 106. For example, with respect to FIG. 1 and FIGS. 4A-4B, a remote service system that provides search data updates and/or search functionality may be referred to herein as a "remote search system 110" or "search system 110." As another example, with respect to FIG. 1 and FIGS. 8A-8B, a remote service system that provides advertisement data updates and/or functionality may be referred to herein as a "remote advertisement system 112" or an "advertisement system 112." Although multiple remote service systems providing different functionalities and updates may be implemented, in some cases, remote service systems may be described herein as a singular "remote service system" that provides multiple different functionalities.

In some implementations, the local service module 102 may acquire local data, such as user interaction events with the local service module 102 and/or one or more applications 114 on the user device. Example interactions may include search interactions (e.g., search queries, result selection, etc.), advertisement interactions (e.g., advertisement selections), launcher interactions (e.g., GUI interactions), and/or other web/application interactions (e.g., application installs/opens). The local service module 102 may use the acquired data to provide local functionality, such as personalized search results and/or advertisements. In some implementations, the local service module 102 may send the acquired data to the remote service system 106. The remote service system 106 may provide remote functionality (e.g., search results and/or advertisements) based on the acquired data from one or more users. In some implementations, the remote service system 106 may provide update data to the local service module 102 based on user/aggregate acquired data.

A user device 100 may include an operating system 116 and installed applications 114, such as a launcher application, a web browser application, a search application, and/or additional applications. The local service module 102 may provide a variety of functionality to one or more applications 114 on the user device 100. For example, the one or more applications may act as intermediary applications via which the local service module 102 may provide functionality to a user.

The local service module 102 may be implemented on the user device 100 in a variety of ways. In some implementations, the local service module may execute as a stand-alone application that provides services (e.g., search/advertisements) to other applications (e.g., see FIG. 2A). For example, the local service module may be executed as a background service on the user device (e.g., referred to as a background service, background process, or daemon). In this example, the applications on the user device may access functionality provided by the local service module. Additionally, in this example, the local service module may not generally provide a stand-alone graphical user interface for the user. Instead, in this example, the applications that access the local service module functionality may provide a GUI for user interaction.

In some implementations, the local service module 102 may be integrated into one or more applications on the user device 100. For example, in some implementations, a launcher application may include the local service module (e.g., see FIG. 4B). In this example, the launcher application may provide a user interface and other GUI elements that access the local service module, such as a launcher search page, a launcher search bar (e.g., a search query entry box), a launcher advertisement space (e.g., one or more spaces for advertisement links), and/or one or more gestures. Although the local service module is illustrated and described herein as being integrated into a launcher application (e.g., see FIG. 4B), the local service module may be integrated into other applications. In one specific example, the local service module may be integrated into a news application. In this specific example, the local service module may provide search functionality for the news application. In another example, the local service module may be included in a search application that searches for applications available on one or more digital distribution platforms 118. Note that applications including the local service module may include their own application functionality in addition to the local service module (e.g., illustrated as additional app functionality modules in FIG. 2B and FIG. 4B).

The applications that include the local service module 102 may be implemented on the user device 100 in a variety of ways. In some implementations, the user may download the application (e.g., from a digital distribution platform 118) and install the application on the user device 100. In other implementations, the application may be installed on the user device before the user purchases the user device (e.g., as a preloaded application). In some cases, the application may be referred to as a "native application" or a "widget."

The local service module 102 may be integrated by parties prior to a user purchasing the user device. For example, a device manufacturer, cell-phone service provider/carrier, or other business may load applications onto a user device prior to selling the user device to the user. In some implementations, the local service module may be installed by a carrier (e.g., a cell phone carrier) when a user device connects to the carrier network. In some implementations, the local service module may be provided to software developers for integration into an application that is subsequently given to a party (e.g., a device manufacturer, cell-phone service provider, etc.) for integration into the user device prior to, or as part of, the user purchase or first activation of the user device. In some implementations, the local service module may be provided to a software developer for integration into an application that is then provided for download from one or more digital distribution platforms 118. In some cases, the developer of the local service module may integrate the local service module into their own application (e.g., their own launcher application) and then provide the application to device manufacturers, cell-phone service providers/carriers, and/or other parties for integration into user devices. In other cases, the developer of the local service module may integrate the local service module into their own application and subsequently provide the application for download from one or more digital distribution platforms 118.

Figure 2A:
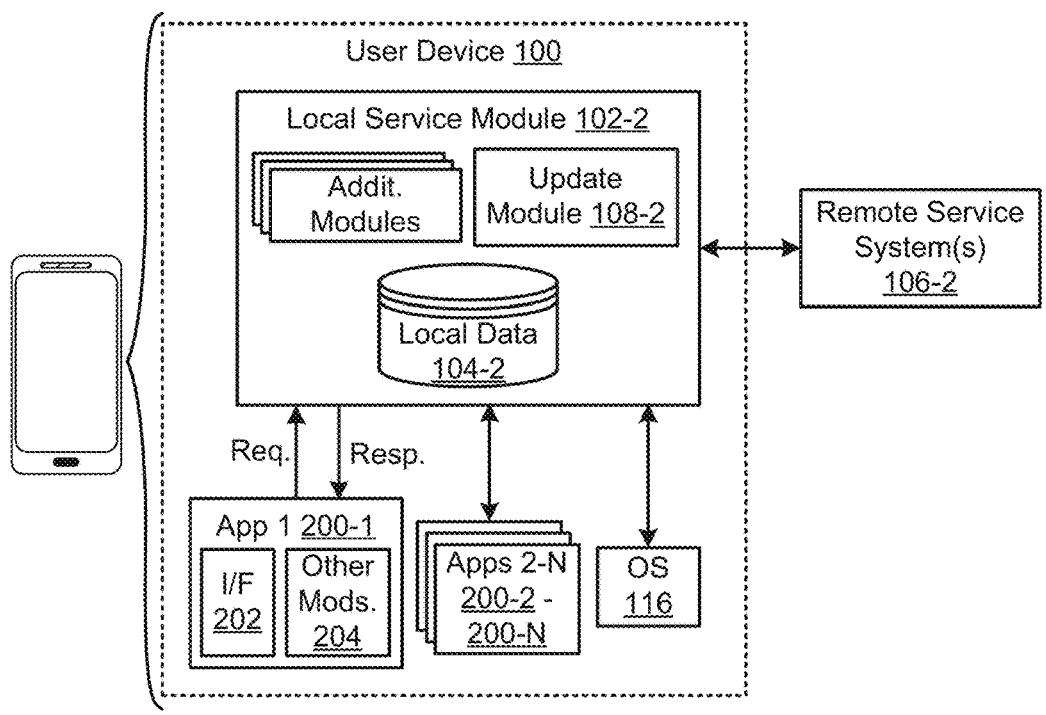
FIGS. 2A-2B illustrate example implementations of a local service module.

Applications/systems may include interface modules that communicate with the local service module (e.g., see I/F module 202 of FIG. 2A). In some implementations, the developers of the local service module may develop the interface modules and provide the interface modules to other application developers for integration (e.g., integration into a launcher application or other application). Example communication technologies between the local service module, other installed applications, and/or remote systems may include, but are not limited to, API calls, interprocess communications, local network calls on the same device, shared local storage/memory, and/or others communication technologies.

The extent of the functionality provided by the local service module and/or the application that interfaces with the local service module may be configurable. For example, a local service module may be configured to provide any combination of functions described herein, such as search, advertisement, zero state, and/or other functions. Similarly, an application developer may configure their application UI, or other functionality, to interface with the local service module in a variety of ways. In some implementations, update bundles may also include updates to the interface module, or instructions that change the configurations. Additionally, or alternatively, the application developers may update the interface module separately from the local service module. In some implementations, the local service module may change functionality after deployment. For example, a party may deploy the local service module with only search activated, and then activate additional functionality at a later time (e.g., advertisements, zero state, etc.).

In some implementations, the local service module may communicate with applications using a local request and local response communication technique. For example, an application may send a request data structure to the local service module. In response to the received request data structure, the local service module may perform a function and then provide a local response to the request. The application generating the request may be referred to herein as a "requesting application" in some cases. The naming of the request/response herein may also depend on the type of functionality requested from the local service module. For example, an application that is requesting search results may generate a search request data structure (i.e., a "search request") and receive a search response data structure (i.e., a "search response"). As another example, an application that is requesting advertisements may generate an advertisement request data structure (i.e., an "advertisement request") and receive an advertisement response data structure (i.e., an "advertisement response"). The naming of the local service module herein may also depend on the type of functionality provided by the local service module. For example, a local service module that provides search functionality or advertisement functionality may be referred to as a "local search server" or "local advertisement server," respectively.

The user device may include one or more implementations of the local service module described herein. For example, a single user device may include one or more local service modules as background services and/or one or more local service modules included in one or more additional applications.

Figure 2B:
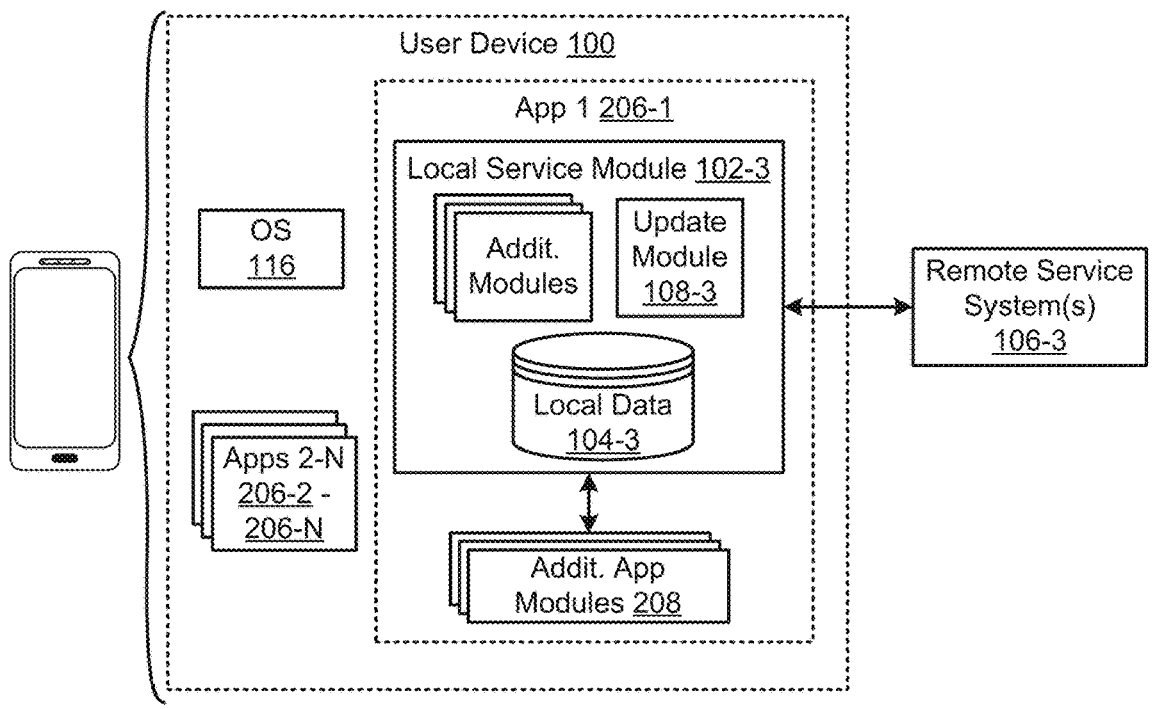

FIGS. 2A-2B illustrate example implementations of the local service module 102. In FIG. 2A, the local service module 102-2 acts as a service to one or more applications

200. Application 1 200-1 includes an interface module 202 and additional modules 204 that provide application functionality for application 1. In FIG. 2A, the applications 200 may make requests to the local service module 102-2 and receive responses from the local service module 102-2 (e.g., via the interface module 202).

In FIG. 2B, the local service module 102-3 is integrated into application 1 206-1. Application 1 206-1 also includes additional modules 208 that provide functionality associated with application 1 206-1, such as UI modules and other functionality provided by application 1 206-1. For example, if application 1 206-1 is a news application, the application 1 modules may acquire and display news articles to the user. In this example, the local service module 102-3 may provide additional functionality, such as performing searches for news articles and/or providing advertisements for the news application. Although not illustrated, application 1 206-1 may also include an interface module that provides for communication between the local service module 102-3 and the other application 1 modules 208. The communication between the application 1 modules 208 and the local service module 102-3 in FIG. 2B may also be characterized as a local request/response communication in some examples.

In some implementations, the local service module may be provided special privileges relative to other applications on the user device. For example, the local service module may be provided special permissions and access to local data that is not typically accessible by other applications. The local service module may be provided special privileges/permissions in the case that an original equipment manufacturer (OEM) or other party (e.g., OS developer) has integrated the local service module into the OS and/or the local service module is part of the OEM delivered product that comes with the OS when the user device is first sold to the user.

Figure 3:
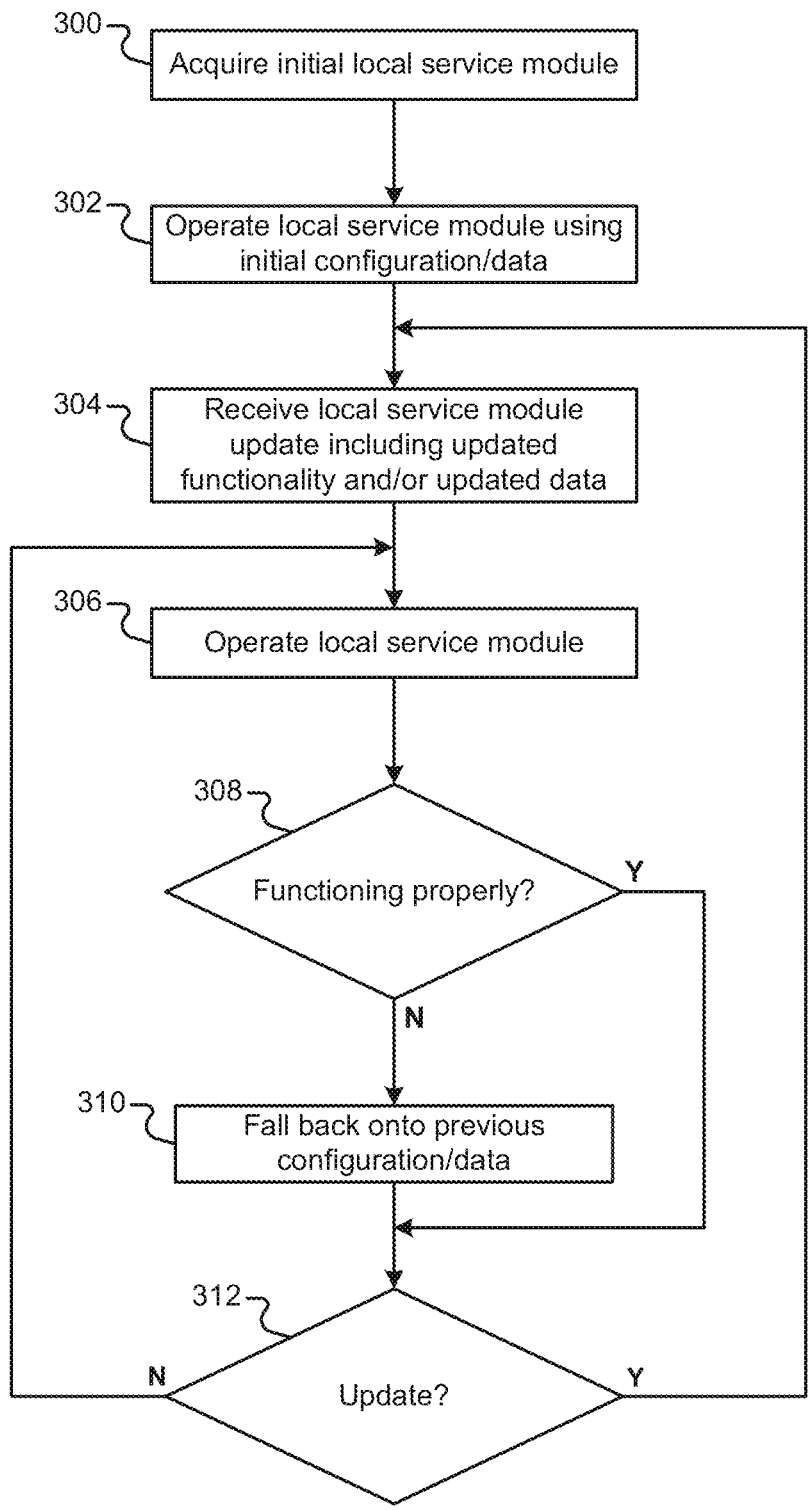
FIG. 3 illustrates an example method that describes acquisition, operation, and updating of a local service module.

FIG. 3 illustrates an example method that describes acquisition, operation, and updating of the local service module 102. In block 300, a user device acquires an initial local service module. The local service module may be implemented as a stand-alone service for one or more applications and/or included in an application. As described herein, the initial local service module may be included on the user device by the device manufacturer or other party in a plurality of different manners. The initial local service module may refer to the initial version of the local service module, as provided by the developer, before any updates are received from the remote service system 106. The initial local service module may include initial configuration parameters and data, such as initial search/advertisement algorithms (e.g., initial scoring/selection functions) and/or initial search/advertisement data (e.g., initial search/advertisement records).

In block 302, the user device operates the local service module 102 using the initial configuration parameters and data included in the initial local service module version. In block 304, the local service module 102 receives an update that may include updated functionality (e.g., algorithms) and/or updated data. For example, the update module 108 may have requested the update data (e.g., search update data and/or advertisement update data). In block 306, the user device may operate the local service module 102, as modified by the updated data.

In block 308, the local service module 102 may determine whether the update is functioning properly. If the update is not functioning properly, in block 310, the local service module 102 may revert back to using the initial configuration/data (e.g., algorithms and data) or a previously acquired functioning update (e.g., a stable version) in the case that multiple previous updates have been received over time. In block 312, the local service module 102 (e.g., update module 108) may determine whether to acquire an update. As described herein, in some implementations, the remote service system 106 may push updates to the user device.

As described with respect to blocks 308-310, the local service module 102 may determine whether the updates (e.g., algorithms/data) are functioning properly. The local service module 102 may determine that an update is not functioning properly in a variety of ways, such as: 1) detecting an exception (e.g., a hardware/software exception, an algorithm error, a SQL error, etc.), 2) detecting a timeout (e.g., a network timeout or other timeout), and/or 3) determining that no results or poor results are being generated. In some implementations, the local service module 102 may begin using an earlier update in response to a malfunction. In some implementations, the local service module 102 may be configured to determine that the local service module 102 is not functioning properly while waiting for results to be returned. In these implementations, the local service module may load a prior stable update while waiting for results. Additionally, the local service module may execute the prior function using the prior stable update so that the local service module may provide results to the user immediately, assuming the possibly malfunctioning update does not return results before the newly loaded update is done providing results. Falling back onto a prior stable update may provide for a positive user experience by reducing waiting times for a current, possibly malfunctioning update, to return results.

As described herein, the local service module may include some defined software components, such as software components that were defined during installation of the local service module or other application including the local service module. As further described herein, some modules included in the local service module (e.g., search and advertisement modules) may have configurable/modifiable functionality in addition to the defined software components. The configurable/modifiable functionality may be updated by received update data (e.g., update bundles) over time. The configurable functionality may also include configurable/modifiable data, such as search and advertisement data used to generate search and advertisement results, respectively.

Example configurable functionality/data that may be updated may include search result selection/scoring algorithms, search record data, advertisement selection algorithms (e.g., advertisement selection/scoring functions), and advertisement record data. The local service module may receive different types of updates. In some cases, the local service module may update algorithms (e.g., search/advertisement algorithms) without updating data (e.g., search/ad records). In other cases, the local service module may update data without updating algorithms. In other cases, the local service module may update both algorithms and data. In some implementations, the updates may enable and/or disable functionality, such as search/ads selection algorithms, UI components, and/or other functionality described herein.

Updates to the installed local service module functionality, such as updates to search and advertisement functionality, may differ from updates to other applications. If the local service module is installed as a stand-alone application (e.g., a service), an update to the local service module functionality (e.g., search/ads) may differ from a complete update to the local service module. For example, a complete update (e.g., a reinstallation of the local service module)

may include updating the defined software components of the local service module or application that includes the local service module, whereas updates to some functionality of the local service module may include updates to the configurable data associated with the local service module. Updating the configurable functions (e.g., algorithms) and data associated with the local service module may occur while the local service module is running (e.g., being executed) on the user device. Additionally, falling back onto previous configurations of the local service module may occur while the local service module is running on the user device.

In some implementations, an update to a typical application, such as a launcher application, may require a restarting of the application and/or rebooting of the user device. An update to the local service module functionality may not require that the local service module, or application including the local service module, be restarted. In some implementations, the local service module and/or application that includes the local service module may have the same defined software components before and after a received update bundle, as the defined software components may not have been modified/rewritten by the local service module update. In these implementations, the local service module and/or application may be the same version of application after the update, whereas the local service module may be executing an updated version of the configurable data.

The local service module may be updated more frequently than an application including the local service module. For example, if the local service module is included in a launcher application provided by a device manufacturer or other party before purchase of the user device, the launcher application may be subject to longer service cycles before an update. For example, a launcher application may take weeks or months for updates, while the local service module (e.g., included in a launcher application) may receive updates at a much greater rate (e.g., multiple sequential local service module updates per single launcher update). Such an asynchronous update cycle difference between the launcher application and local service module may allow the local service module developer to provide up to date functionality (e.g., search/ads functionality) to a user without relying on general launcher application updates. In some cases, the shorter update cycle for the local service module functionality may allow the local service module provider to update/ tweak algorithms and data more often to provide a better user experience.

In some implementations, the local service module may be developed and supported by a party that is different from the party that develops and supports the application including the local service module. For example, a launcher application may be developed by a first party, while the local service module is developed and supported by a second party. The first and second parties may operate different servers that provide updates for their respective applications/ modules. For example, the local service module functionality may be updated by a party that is different than the launcher developer.

The local service module 102 of the present disclosure may provide immediate and relevant results (e.g., search results and advertisements). Additionally, the local user data, such as application installation/usage data, may be used to enhance the personalization and relevance of the results. Using local user data to enhance personalization and relevance may also maintain a user's privacy, as the local data may be maintained on the user device.

The local service module 102 may also provide results in a reliable manner due to the local nature of the operations. For example, the local service module may provide results regardless of internet connection status. Although the local service module may provide results locally, in some implementations, the local service module may retrieve results from the remote service system(s) 106, which may enhance functionality and/or content provided to the user.

Figure 13:
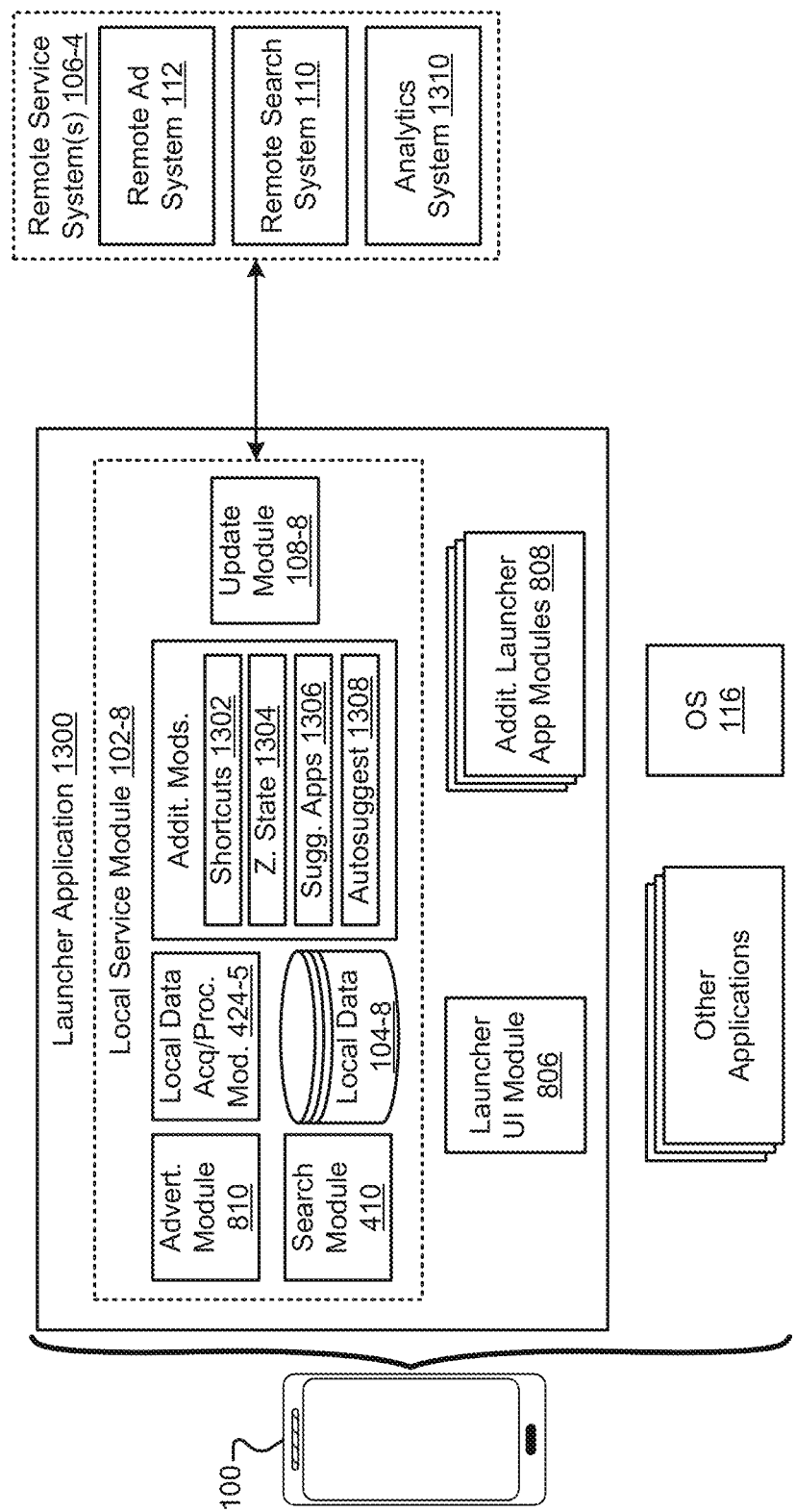
FIG. 13 illustrates an example launcher application including a local service module that provides local search functionality, advertisement functionality, and additional functionality.
Figure 14:
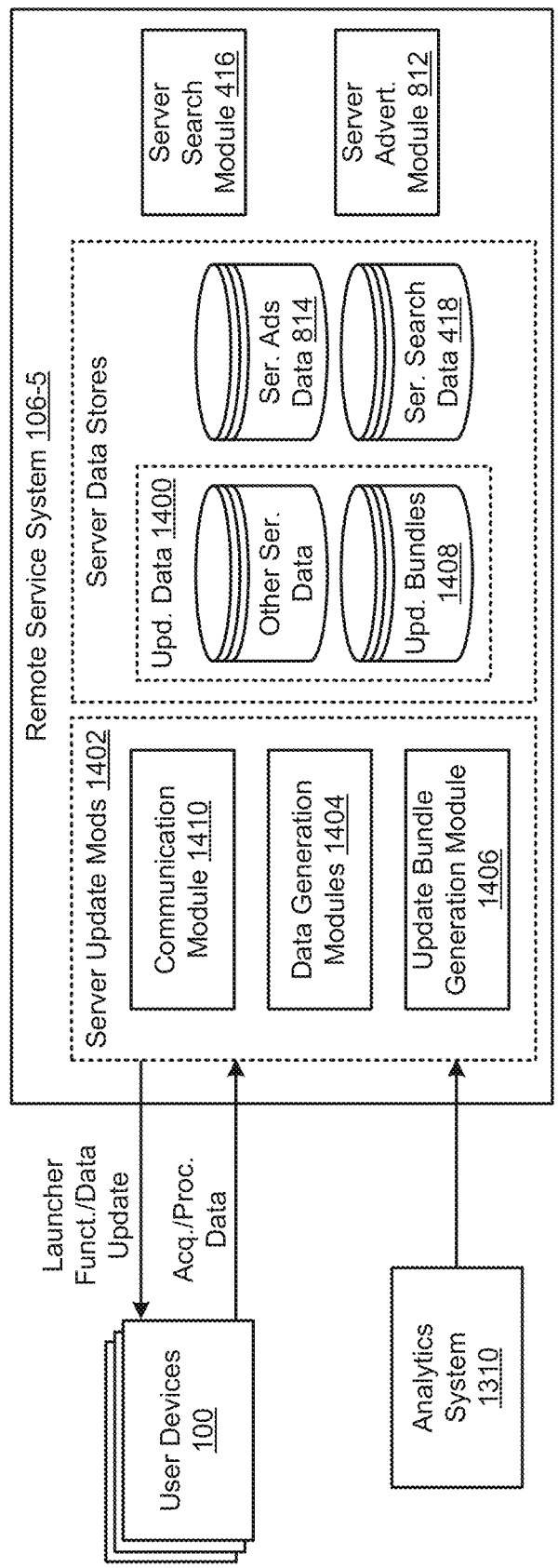
FIG. 14 illustrates an example remote service system that provides updates to the local service module.
Figure 15:
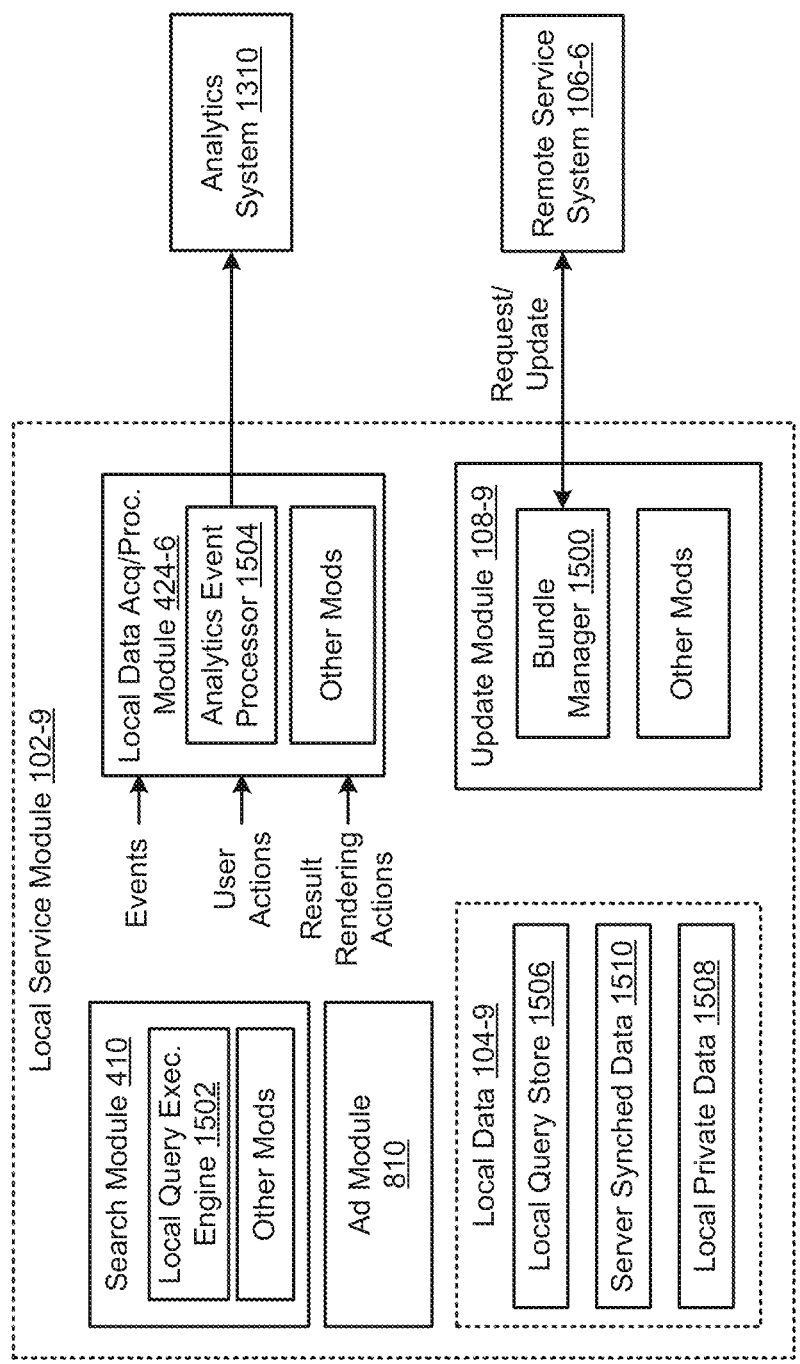
FIG. 15 is a functional block diagram of an example architecture for a local service module.
Figure 16:
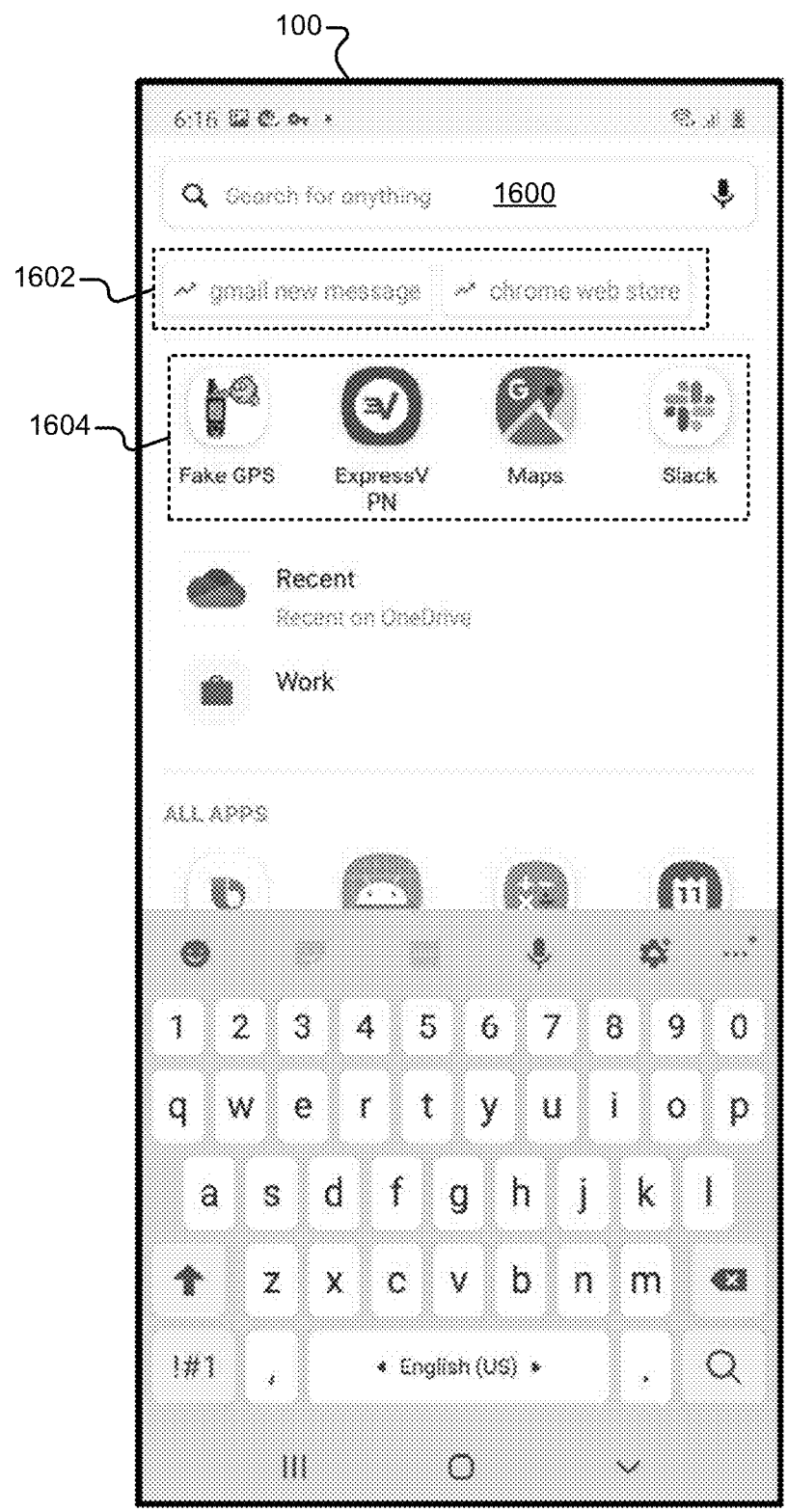
FIGS. 16-17 illustrate example graphical user interfaces (GUIs) that may be generated by an application including a local service module.
Figure 17:
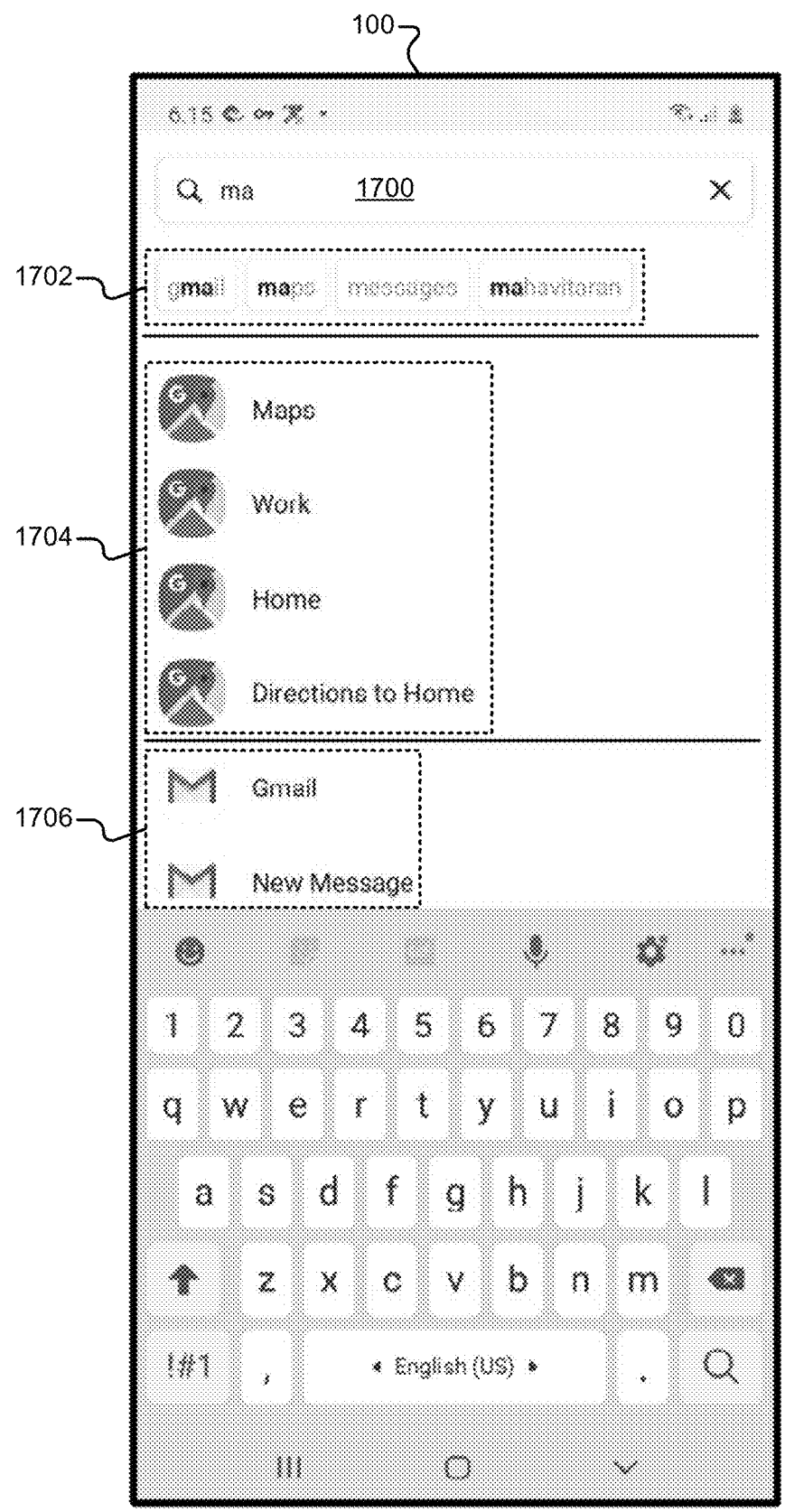
Figure 18:
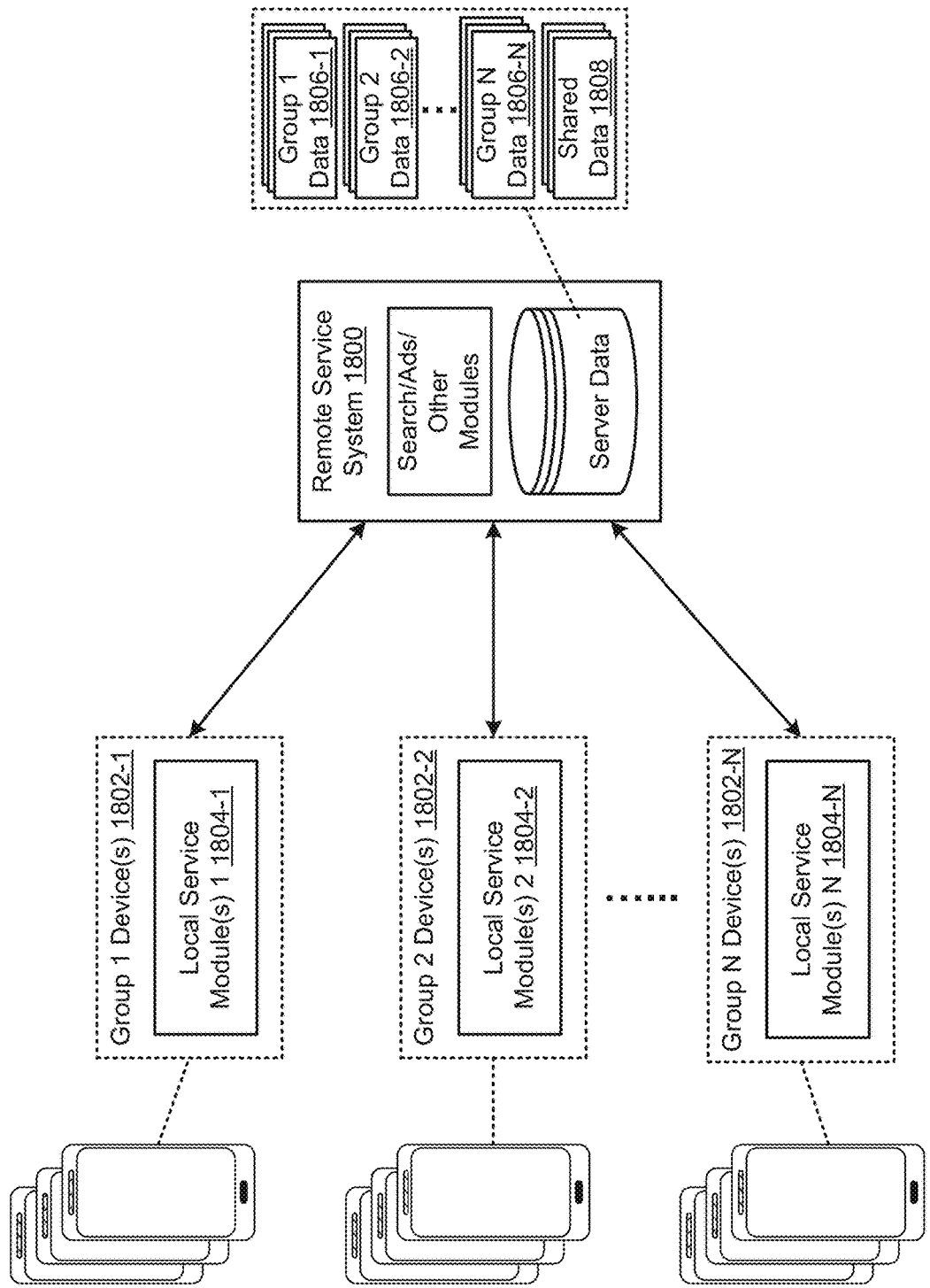
FIG. 18 illustrates an example remote service system in communication with groups of user devices that implement local service modules.

FIGS. 4A-7 illustrate example implementations of a local service module that includes search functionality. FIGS. 8A-12 illustrate example implementations of a local service module that includes advertisement functionality. FIG. 13 illustrates a launcher application including a local service module that may provide search functionality, advertisement functionality, and additional functionality (e.g., shortcuts, zero state, etc.). FIGS. 14-15 illustrate example implementations of the remote service system and the local service module. FIGS. 16-17 illustrate example GUIs for query hints and autosuggest functionality. FIG. 18 illustrates an example environment in which one or more remote service systems update a plurality of different groups of devices that may execute similar/different local service modules.

Referring to FIG. 1, the example environment includes a plurality of user devices 100 in communication with one or more remote service system(s) 106 (e.g., one or more server computing devices) via a network 120 (e.g., the Internet). The network 120 may include a local area network (LAN), wide area network (WAN), and/or the Internet. Example user devices 100 may include, but are not limited to, a smartphone, laptop, tablet, desktop, and wearable computing devices. Other example user devices may include smart assistant devices (e.g., smart speaker devices) and appliances. Example smart speaker devices may include, but are not limited to, an AMAZON ECHO® smart speaker by Amazon.com, Inc., a GOOGLE HOME® smart speaker by Google, Inc., or an Apple HOMEPOD® smart speaker by Apple, Inc.

The environment includes one or more digital distribution platforms 118. The digital distribution platforms may represent computing systems that are configured to distribute applications to user devices. Example digital distribution platforms include, but are not limited to, the GOOGLE PLAY® digital distribution platform by Google, Inc. and the APP STORE® digital distribution platform by Apple, Inc. Users may download the applications from the digital distribution platforms 118 and install the applications on user devices 100.

The environment includes advertiser devices 122 that may communicate with the user devices 100 and/or remote service system(s) 106 in implementations where the local service module 102 and the remote service system(s) 106 provide advertisement functionality. For example, advertisers may use the advertiser devices 122 to provide advertisement data to the user devices 100 (e.g., local service modules) and/or remote service system(s) 106. The environment may also include advertisement (ad) networks 124 that may provide advertisements (e.g., generated by advertiser devices 122) to the user devices 100 and/or remote service system(s) 106. For example, as described herein, the advertiser devices 122 and ad networks 124 may provide advertisement data to an advertisement system 112, which may then provide the advertisement data to the user device 100.

The environment includes one or more data providers 126. The data providers 126 may represent computing systems that provide event data ("external event data") to the remote service system(s) 106 or other systems operated by other parties, such as other search systems and advertisement systems. In some implementations, the data providers 126 may be businesses that provide data management and analytics services. The data providers may collect data regarding how users are using the remote service system 106 (e.g., the search/advertisement systems 110, 112), applications, and/or websites. The data provider systems 126, remote service system(s) 106, and digital distribution platform(s) 118 may be operated by one or more parties (e.g., one or more businesses).

The environment may include application-specific servers 128 that may represent remote functionality associated with the applications installed on the user device 100. For example, the Yelp application may access Yelp-specific servers to provide some functionality for the Yelp application. In some cases, the application-specific servers 128 may provide data to applications installed on the user device. In some cases, the app-specific servers 128 may acquire siloed user data indicating user behavior within the specific application on the user device.

Figure 4A:
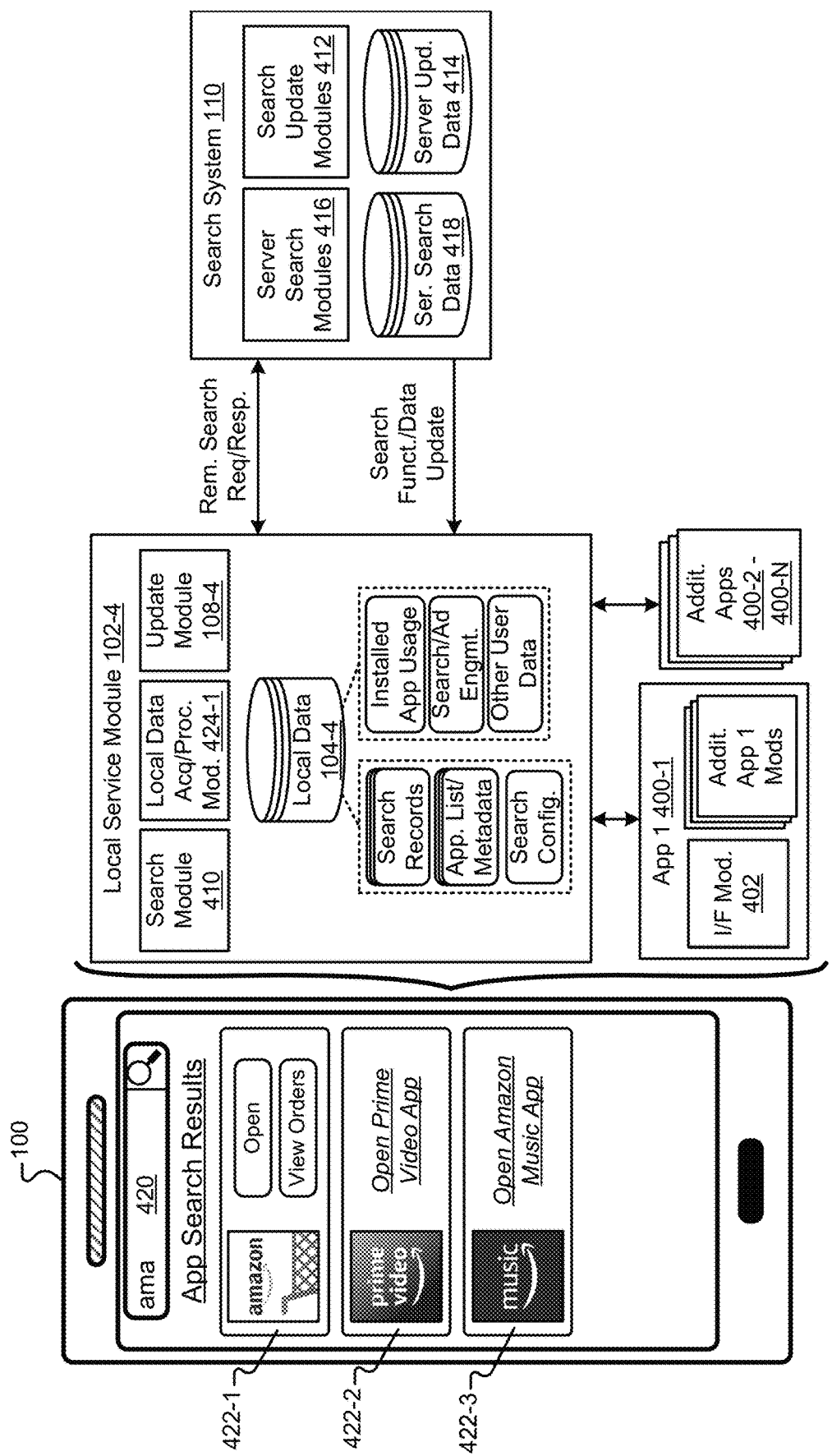
FIGS. 4A-4B illustrate example implementations of a local service module that provides local on-device search functionality.
Figure 4B:
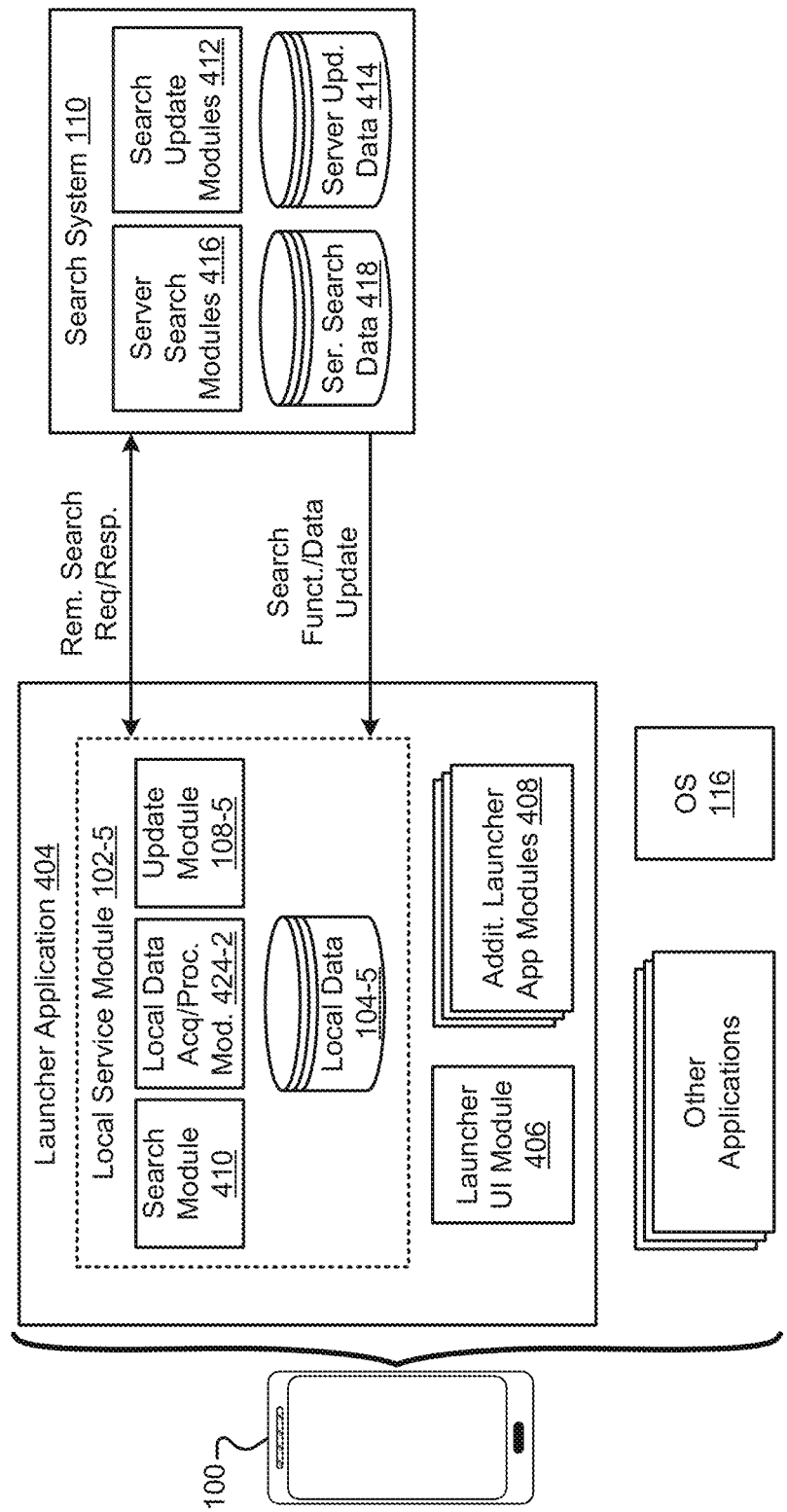

FIGS. 4A-4B illustrate example implementations of the local service module that provide local on-device search functionality. The local search functionality may provide search results based on data stored locally on the user device. For example, the local search functionality may provide search results based on an entered user search query or other input. FIGS. 4A-4B also include a remote service system (e.g., a search system 110) that may provide updates to the search functionality provided by the local service module 102. Additionally, in some implementations, the search system 110 may provide remote search functionality.

In FIG. 4A, the local service module 102-4 acts as a search service to one or more applications 400-1 to 400-N. In FIG. 4A, the applications 400 may make search requests to the local service module 102-4 and receive search responses (e.g., search results) from the local service module 102-4 (e.g., via an interface module 402). In FIG. 4B, the local service module 102-5 is integrated into a launcher application 404. The launcher application 404 also includes additional modules that provide functionality associated with the launcher application 404, such as a launcher UI module 406 and other functionality (additional launcher app modules 408) provided by the launcher application 404.

A UI module included in a launcher or other application may provide a UI for a user. For example, the UI module may provide a GUI for the user. With respect to a launcher application, the GUI may include application icons that may be selected by the user to launch an application. The launcher GUI may provide multiple screens, such as a home screen and other screens that may be accessed by gestures (e.g., swiping). The GUI may also include other interfaces, such as search bars (e.g., for launcher-based search), search results pages, application/web links that open applications and websites, application/web advertisement links, graphical keyboard inputs, and other interfaces that may be described herein. The launcher application 404 (e.g., UI module 406) may receive user input (e.g., one or more touches/gestures) and provide various functionality in response to the inputs, such as changing between screens, launching applications, initiating search functionality, and other functionality. In some implementations, the launcher application 404 may be provided along with an operating system 116 of the user device 100. In some implementations, the launcher application 404 may be provided by a third-party developer as an application that can be installed on the user device 100. Although the various functionalities may be provided by the launcher application 404 described herein, in some implementations, a user device 100 may include one or more other applications (e.g., a search application) that provide the functionality attributed to the launcher application 404.

The local service module 102-4, 102-5 includes a search module 410 and local data 104-4, 104-5 (e.g., search data and other data) that provide the local search functionality. For example, the search module 410 may receive a search request and generate a search response (e.g., search results) based on the search request. The requesting application (e.g., application 1 400-1 of FIG. 4A) or launcher application including search (e.g., see FIG. 4B) may render a search GUI that may receive a user input (e.g., search query) and render the search results.

As described herein, the local service module 102 including search functionality may be implemented in a variety of ways, such as a service to applications, or as a component of applications (e.g., a search component of a launcher application). In some cases, the search module functionality may be described herein with reference to the implementation of FIG. 4B in which the local service module is included in the launcher application. In these cases, the search functionality provided by the search module may also be attributed generally to the local service module and/or the launcher application.

The local service module 102 may use local data 104 to provide search functionality, advertisement functionality, and/or other functionality described herein. The local data 104 illustrated in the figures (e.g., FIG. 4A, FIG. 8A, etc.) may include a variety of types of data, which may be referred to herein in a variety of different ways. Example local data classifications described herein may include search data, advertisement data, and user data. Search data may include, but is not limited to, local data used for search, such as search configuration data and search record data (e.g., see FIG. 6). Advertisement data may include, but is not limited to, local data used for advertisements, such as advertisement configuration data and advertisement record data (e.g., see FIG. 10). User data may include, but is not limited to, local data indicating how the user has interacted with the user device, such as a launcher application and/or other applications.

As described herein, the local data may be used in a variety of different manners, such as for different functionality (e.g., search and advertisements). As such, the example classifications of local data herein are for description/illustration purposes only and do not necessarily limit the use of the local data for a specific function. For example, some local data used for search data may also be used for advertisement data.

Furthermore, the illustration and description of local data (e.g., in a local service module of FIG. 4A and FIG. 8A) does not necessarily limit the location and access permissions associated with the local data. For example, some local data may be accessible by the local service module, while other local data may be accessible by applications, the OS, etc. As such, example local data described herein may be stored/accessed in a variety of ways.

The local service module 102 may receive initial search data from the search system 110 and subsequently update the local search data based on search data updates received from the search system 110. The search module 410 may perform searches based on the local search data. Although the search module 410 may generate search results using local data, in some implementations, the search module 410 may request search results from the search system 110. The search system 110 may include server search update modules 412 and server search update data 414 that may provide updates to the local search module 410 and local data 104. The search system 110 may include server search modules 416 and server search data 418 that may provide remote search functionality in a manner similar to the local search module 410.

In some implementations, the search module 410 may personalize the search results (e.g., perform a personalized search). For example, the search module 410 may personalize search results based on local user data that indicates which applications are installed on the user device. The search module 410 may also personalize search results based on usage data for the installed applications. Usage data may indicate different user events associated with the applications, along with the time at which the events occurred. Example user events may include application installation, application uninstallation, reinstallation, application opens, application page views, and commerce events (e.g., adding to a shopping cart and/or completing a purchase). In some implementations, the search module 410 may report search usage data to the search system 110, such as query history and search result selection.

Search results may be shown to the user immediately in response to user search query input when search is performed locally on the user device. For example, the search module 410 may provide search results (e.g., to the launcher application 404 or another application 400) in response to the user inputting a single query letter into a search GUI. The search module 410 may also update the search results immediately in response to entry of additional search query characters.

The local search data, which may be obtained/updated from the remote search system 110, may be used to provide immediate and relevant search results. Additionally, the local user data, such as application installation/usage data, may be used to enhance the personalization and relevance of the search results. Using local user data to enhance personalization and relevance may also maintain a user's privacy, as the local data 104 may be maintained on the user device 100.

The search module 410 may provide immediate and relevant search results in a reliable manner when the search results are generated locally. For example, the search module 410 may provide search results regardless of internet connection status. In a specific example, the search module 410 may provide relevant search results when there is no internet connection or a poor internet connection. Although the search module 410 may provide search results locally, in some implementations, the search module 410 may retrieve search results from the remote search system 110.

The user can enter a search query into a launcher application search GUI. For example, the user can enter a search query into a search bar by typing/speaking the search query. The launcher application 404 may generate a local search request including the search query and other data. The search request data structure may be referred to as a query object. The query object may include the user search query (e.g., text/numbers) along with additional user search query data. In some implementations, the launcher application 404 (e.g., local service module 102-5) can acquire context data to include in the query object. Context data may include a variety of types of data, such as a user ID, operating system information, device type information, geolocation data, time of day, query history data (e.g., one or more prior queries in the launcher application), application usage data, user state of motion data (e.g., walking, biking, driving), user-historical context (e.g., all of the above historically), and/or category of the query (e.g., selected in the GUI). In some implementations, the launcher application 404 can include user-specific data in the query object, such as user preferences and/or user historical data associated with the launcher application. Example user-specific data may include, but is not limited to, application usage data (e.g., app-specific usage data), user demographic data, user geo-location preferences, past queries, and vertical/categorical preferences, such as cuisine preferences or hotel preferences. The launcher application 404 may store the user-specific data. In some implementations, some query object data described herein may be acquired by the search module 410 at search request time.

The search module 410 may generate search results for the launcher application 404 to display. The search results can include a variety of data. Data associated with a single search result may be referred to as a "search result data object" or a "search result object." As described herein, a single search result object may include display data, access data, and a result score. The launcher application 404 (e.g., UI module 406) may use the display data to render the search result in a search GUI. The display data may include, but is not limited to: 1) the application name, 2) the title of the result (e.g., a restaurant name), 3) a description of the state associated with the result (e.g., a description of a restaurant), and 4) one or more images associated with the application/state.

A search result object may include access data that the user device and/or launcher application can use to access the application state associated with the search result (e.g., an application state for one of the other applications). An application state may generally refer to a page/screen of an application. In some cases, the access data can include application uniform resource identifiers/locators (URIs/URLs) that launch the application states on the user device. In other cases, the access data can include application metadata that the application can use to access the application/state. A user may access a variety of different applications and application states (e.g., pages) in different applications.

The launcher application may render the search results as user-selectable links that may open applications installed on the user device and access application content within applications and websites. For example, some user-selectable links may access an application home state (e.g., application home page), such as a main page of an application that is typically accessed upon opening the application. As another example, some user-selectable links may access application content states (e.g., pages) for an entity within the application. The user can select (e.g., touch/click) one of the user-selectable search results in the search GUI. The user device can open the application state associated with the search result using the access data included in the received search result. The user may then interact with the accessed application state on the user device. If the application is not installed on the user device, the user device may download the application and subsequently access the state associated with the user-selected search result.

FIG. 4A illustrates an example search application GUI (e.g., generated by a UI module 406 of the launcher application 404 or other application). In FIG. 4A, the user enters a partial search query "ama" in the search bar 420 (e.g., text box), which may trigger a search. For example, the user may have started entering "ama" with the intent of typing "amazon" and opening the Amazon Shopping application or other Amazon applications. The launcher application (e.g., a search module 410) locally identifies and ranks application links 422-1, 422-2, 422-3 for opening the following installed applications: 1) the Amazon Shopping application, 2) the AMAZON PRIME® Video application, and 3) the Amazon Music application. The user may select (e.g., touch/click) any of the search results to open the corresponding installed applications. In some implementations, search results may include additional links to content within an application. For example, the Amazon Shopping application link 422-1 in FIG. 4A may also include application links to specific application states in the Amazon Shopping application, such as a link to viewing a cart with a user's order(s).

FIG. 5 illustrates an example method that describes operation of the environment of FIG. 4B. In block 500, the local service module 102-5 acquires search data (e.g., search indexes, scoring functions, etc.) from the search system 110. In block 502, the launcher application 404 receives a user search query. In block 504, the search module 410 generates search results locally on the user device 100 based on the user search query and/or other data (e.g., user data, user context data, etc.). The search results may include links that open applications that are installed on the user device. The search module 410 may use on-device data as well as data cached from the search system 110 to generate the search results.

In block 506, the launcher application 404 renders the search results. The user may then select (e.g., touch/click) one of the rendered search results. In block 508, the launcher application 404 detects user selection of a search result. In block 510, the user device accesses an application state for an installed application in response to selection of the search result. Alternatively, in block 510, if a search result is displayed for an application that is not installed, the user device may access an application/web page associated with the search result. In some cases, the user device may access an application/web page of a digital distribution platform for downloading the application. In some cases, the user device may be routed to (e.g., "deep linked") into the application state after installation.

Referring to FIG. 4A, the local service module 102-4 includes a search module 410 that generates search results based on local data 104-4, such as local search data (e.g., search indexes, search configuration data, etc.) and locally stored user data (e.g., application usage data). The local service module 102-4 may include an update module 108-4 that retrieves updates from the search system 110. The updates may modify the functionality of the search module 410. Additionally, or alternatively, the updates may modify the local search data.

The search module 410 may generate search results based on search data included on the user device. Example search data included on the user device in FIG. 4A may be represented as an application list and associated metadata. Example search data may also be represented as search records (e.g., see FIG. 4A and FIG. 6).

The search data may include a variety of data structures used for search, such as lists, tables, one or more search indexes, etc. In some implementations, the search data may include an application list (e.g., installed application list) and associated application metadata for each application in the list. For example, the search data may include a list of application identifiers (IDs) and corresponding search queries that may map to the application ID. Additional example application metadata may include other keywords associated with the applications. The search module 410 may identify applications for the search results based on matches between the search query and the application metadata associated with the applications. The application metadata may be based on search data acquired from the search system 110 that indicates the types of search queries and keywords other users may use to identify the applications for selection. In some cases, the application metadata may be based on locally acquired user data (e.g., search engagement data) that indicates search queries corresponding to applications the user selects.

FIG. 6 illustrates an example search record 600. A search record 600 may include data associated with an application, such as an application open state (e.g., an application homepage) and/or another application state (e.g., application content for entities, such as businesses). For example, a search record 600 may include data for a specific business review application. As another example, a search record may include data for a specific restaurant in a restaurant review application. The search module 410 may identify and score/filter search records based on a search query and other query data. The search module 410 may generate search results based on the search records.

A search record 600 may include a search record ID 602 that uniquely identifies the search record 600. The search record 600 may include an application name/ID 604 that may include the application name and/or an application ID that identifies the application (e.g., uniquely identifies the application) associated with the search record 600. The search record 600 may also include an installation status indicator 606 that indicates whether the application is installed on the user device 100 and/or whether the application has been installed in the past.

The search record 600 may include search/scoring data 608 that the search module 410 may use to identify the search record 600 and/or score the search record 600. Search/scoring data 608 may include a variety of types of data, such as an application description, application state description, keywords associated with the application, possible partial/complete queries associated with the application, and other data used to identify the application. The description data may include text/numbers that are associated with the application/state, such as text/numbers acquired (e.g., crawled/scraped) from the application state. In some implementations, the description data may include geolocation data, such as a postal address and/or geolocation coordinates (e.g., latitude/longitude). Example description data for an application state and/or webpage may also include a brief description of the entity associated with the application state (e.g., a business, movie, song, etc.), user reviews, rating numbers, and business hours.

The search/scoring data 608 may include scoring/filtering data. The scoring/filtering data may include values that are used by the search module 410 to score the search records during search. Example scoring values (e.g., scoring features) may include, but are not limited to, popularity scores, review numbers, rating numbers, aggregate usage values, and application download numbers. Popularity scores may indicate the popularity of the application and/or the popularity of the application state. Aggregate usage values may include data indicating a number of times a plurality of users accessed the application state over a period of time (e.g., daily/monthly). The aggregate usage values may include aggregate values for different geolocations (e.g., cities, states, countries), languages, device types, operating systems, times of day, days of week, and other combinations of parameters.

In some implementations, the search system 110 may determine popularity scores for applications and/or application states based on aggregate usage data, such as aggregate usage values that indicate a number of times the application was downloaded and/or the number of times the application/state was accessed. The popularity scores may be values that are calculated relative to other applications and application states. For example, an application popularity score may indicate a number of times an application was downloaded relative to other applications. As another example, an application state popularity score may indicate a number of times an application state was accessed relative to other application states in the application and/or other applications. In some implementations, the search record 600 may include a plurality of popularity scores for the application/state (e.g., popularity scores for different countries, languages, etc.).

In some implementations, the search/scoring data 608 may include aggregate search/usage data associated with the application. The aggregate search/usage data may include data associated with search and application usage from a plurality of users. For example, the search record 600 may include partial/complete search queries used by other users along with application links selected based on the queries. In a specific example, a search record for the Facebook application may include a partial query of "fb" based on queries or query sessions used to search for the Facebook application by a plurality of individuals. The aggregate search/usage data may also indicate how a plurality of users have used the application.

The search record 600 may include display data 610 that is used to display the search result (e.g., text/images). The search record 600 may also include access data 612 (e.g., URI/URL) for accessing the application state associated with the search record 600. In some cases, the access data can include application metadata that the application can use to access the application state. Example application metadata used to access an application state may include application-specific entity IDs, such as a numeric code used to represent a business in a business review application. In some implementations, the access data 612 may also include web access data, such as a web URL, for accessing a webpage that corresponds to the application state (e.g., a webpage that includes the same/similar information as the application state). Additionally, in some implementations, the access data 612 may include a download link for downloading the application from the digital distribution platform 118 in the case the application is not installed on the user device.

The extent of the search data coverage on the user device may vary. In some implementations, the search data may include data for the applications installed on the user device. In some implementations, the search data may include data for all applications that have been installed on the user device (e.g., including uninstalled applications). In some implementations, the search system 110 may provide search data to the user device that includes search data for additional applications that have not been installed on the user device (e.g., a set of N most popular applications). In some implementations, the search system 110 may predict the applications installed on the user device based on search queries received from the user device, such as local search queries in data reported to the search system 110 and/or queries submitted to the search system 110 during online use of the search system 110 for searches. In some implementations, the search module 410 may filter out search records for uninstalled applications that are identified during search.

The search module 410 may identify and score/filter search records based on a variety of data described herein. For example, the search module 410 may identify and score/filter search records based on matches between data included in the query object and the search records, such as matches between text of the search query and the search record. The search module 410 may also score/filter identified search records based on data associated with the search records, such as scoring features included in the search records. In some implementations, the search module 410 may also identify and score/filter search records based on user data, such as installed apps and previous engagement with the applications.

The search module 410 may generate a result score for each search result (e.g., using a scoring function). The result score may indicate the relevance of the search result to the search query and other query data. The result score for a search record may indicate the relative rank of the search record among other search records for the search query. In one example, a larger result score may indicate that a search record is more relevant to the search query. In some implementations, the result scores may be decimal values from 0.00 to 1.00, where a score closer to 1.00 may indicate that the result is more relevant. The search module 410 may rank the search results in the GUI based on result score. For example, higher scoring search results may be ranked higher in the search engine results page.

The search module 410 may generate result scores in a variety of different ways. In some implementations, the search module 410 may generate a result score for a search record based on one or more scoring features. The scoring features may be associated with the search record and/or the search query (e.g., query object). Example scoring features associated with the search record may include popularity values, aggregate data values, ratings, etc. The search module 410 may determine a result score based on one or more of the scoring features listed herein and/or additional scoring features not explicitly listed.

In some implementations, the search module 410 may include a scoring function. For example, the scoring function may generate result scores based on a plurality of scoring features. In some implementations, the search module 410 may include one or more machine learned models (e.g., a supervised learning model) configured to receive one or more scoring features and output result scores.

In some implementations, the search module 410 may personalize the results by generating result scores based on user data. For example, the search module 410 may score/filter the results based on the installation status of the applications for the user and/or the application usage frequency for the user. In one example, the search module 410 may boost scores for applications that are installed and/or used (e.g., frequently used) by the user. In another example, the search module 410 may remove results for applications not installed on the user device.

In some implementations, the search module 410 may initially identify search records based on a first set of criteria, such as matches between the search query and the search records (e.g., text matches). In these implementations, the search module 410 may select the search results from the initially identified set of search records. In some implementations, the initially identified set of search records may be considered a "consideration set" of search records that may be further scored. For example, the consideration set may be further scored using a scoring function/model, such as a weighted scoring function and/or machine learned model.

As described herein, in some implementations, the search module 410 may generate search results based on user data. Although the user data is illustrated as separate from the search data, the user data may be integrated into the search data locally (e.g., in search records). User data that is used for search may include a variety of types of data. The user data may include application installation and application usage data. For example, the user data may indicate the currently installed applications, when the applications were installed, when applications were used, application usage frequency, specific events performed in the applications (e.g., application opens, page views, commerce events, and custom defined events), when applications were uninstalled, and other application usage metrics. The user data may also include data indicating how the user interacted with the launcher application. For example, the user data may include a list of past search queries, past search results, and result selection. The user data may include time stamps for any of the events described herein, such as time stamps for application installation/usage, searching, and/or result viewing/selection.

In one example, the search module 410 may identify and score/filter search records based on application usage data. For example, the search module 410 may boost search results associated with applications that the user uses frequently and/or has most recently used. In another example, the search module 410 may identify search records based on user data that indicates the applications selected by the user for specific search queries. For example, user data may indicate that the user typically types "fb" when looking for the Facebook application. Note that the search module 410 may identify search records based on personal user data that is learned and stored locally on the user device, as well as aggregate user behavioral data learned from other users. As described herein, the aggregate user behavioral data may be acquired from the remote search system 110 and the remote advertisement system 112.

A user may use the launcher application 404 with the intent of finding one or more specific applications in response to entry of a search query. For example, the user may enter a search query with the intent of finding a single specific application. The specific application (or applications) that the user intends on finding in the search results for an entered search query may be referred to as an "intended application." In a specific example, if the user enters a search query "fb" with the intent of finding a link to open the Facebook application, the Facebook application may be considered as the intended application for the search query.

The search module 410 may identify (e.g., predict) an application as an intended application in a variety of ways. In some implementations, the search module 410 may designate the first application result (e.g., a highest scoring result) as the intended application. In some implementations, the search module 410 may include additional/alternative requirements for an application to be designated as an intended application. For example, the search module 410 may identify an application as an intended application if the search result score (e.g., indicating relevance of the application) is greater than a threshold score. In another example, the search module 410 may identify an application as an intended application if the search result score is greater than other search result scores in the search results by a threshold amount. In some implementations, the search module 410 may require that all (or a portion) of the search query match a string associated with the application (e.g., in the application metadata). In some implementations, the search module 410 may require that the intended application be associated with a threshold amount of usage (e.g., over a specified period of time).

The local service module 102 may update its search functionality over time (e.g., search record identification, scoring, and filtering functions). The local service module 102 may also update its search data over time. For example, the local service module 102 may include an update module 108 that updates the functionality and data for the local service module 102. The update module 108 may acquire updated search functionality and search data (e.g., for search records) from the search system 110.

In some implementations, the update module 108 may report application usage, search usage, and/or search result viewing/selection data to the search system 110 so that the search system 110 may update remote user and/or aggregate data (e.g., aggregate data from a plurality of users). Example updated search data may include any information related to specific applications (e.g., application packages) including, but not limited to, keywords (e.g., alternate keywords), popularity scores, category information, and more. In some implementations, the update module 108 may make update requests to the search system 110 at various times, such as periodically and/or after a threshold amount of time has passed since a prior update. In some implementations, the update module 108 may be configured to acquire updates in response to resuming a previously disconnected/slow internet connection. In some implementations, the data transmitted to/from the search system 110 may be aggregated, obfuscated, or otherwise preprocessed to prevent associating specific user actions to the user's device. For example, a form of differential privacy or a form of federated learning may be implemented.

The update module 108 may generate an update request to the search system 110 that is personalized, such as requests for updates for installed applications. In some implementations, the updates may be "deltas" that are limited to changes since a last update, such as search records for newly installed applications and/or data that has been updated at the search system 110 since the last local service module update. In some implementations, the updates may be tailored toward specific geolocations or other data. In some implementations, the search system 110 may determine and/or predict which applications are installed on the user device. For example, the user device may send a list of installed applications (e.g., using a Bloom filter, differential privacy, and/or secure hashing method) and/or data that allows the search system 110 to predict which applications are installed (e.g., a query history). In some cases, the search data may not be personalized to the user.

In some implementations, the search system 110 may push the updates to the user device. The updates may also be affected by battery level and/or network status. For example, a decision to request an update may have update criteria, such as a threshold battery level and/or connection level.

The local service module 102 may modify behavior based on the internet connection status. For example, some search records may include metadata that indicate the search results should be shown based on the state of the internet connection. In one example, specific application links that are application re-engagement results may require an internet connection to be shown, such as when the link accesses remote resources (e.g., at the application-specific server).

Although the search system 110 may provide data for use in local search on the user device, in some implementations, the search system 110 may provide search results to the local service module 102. For example, in some cases, the search module 410 may retrieve search results from the search system 110. The search system 110 (e.g., server search modules 416 and server search data 418) may generate search results using similar operations as the search module 410 (e.g., identification/scoring/selection operations). In some implementations, the search module 410 may retrieve results from the remote search system 110 as a fallback when sufficiently relevant results are not available locally. In some implementations, the search module 410 may provide local search results in the case that the remote search system 110 is not available due to a poor/unavailable internet connection.

Figure 7:
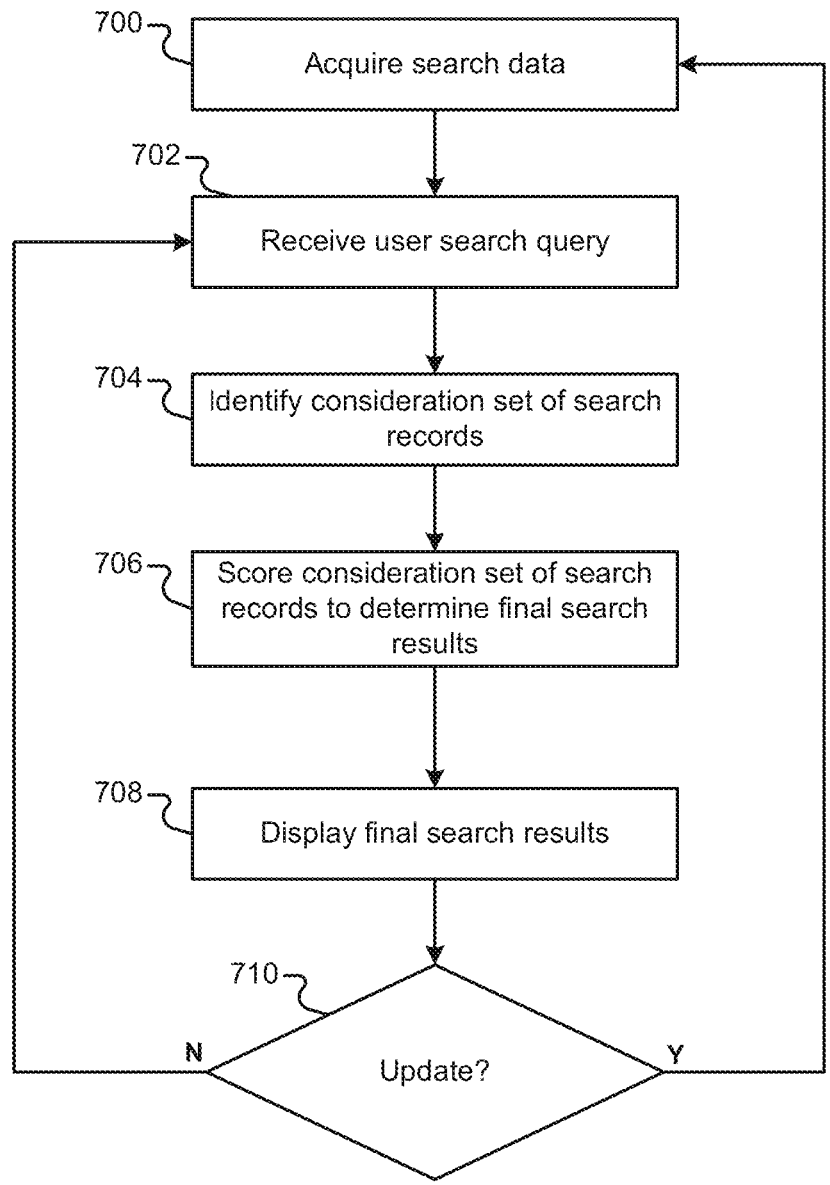
FIG. 7 illustrates an example method that describes operation of a launcher application including a local service module that provides on-device search functionality.

FIG. 7 illustrates an example method that describes operation of the launcher application 404. In block 700, the local service module 102-5 (e.g., update module 108-5) acquires search data from the search system 110. In block 702, the local service module 102-5 (e.g., search module 410) receives a search query (e.g., entered into the launcher application 404). In block 704, the search module 410 identifies a consideration set of search records based on the received search query. In block 706, the search module 410 scores the consideration set of search records to determine the final set of search results. In block 708, the launcher application 404 (e.g., a UI module 406) displays the final search results (e.g., as user-selectable links).

In block 710, the update module 108-5 determines whether to update the search data. If the update module 108-5 requests/receives an update, the update module 108-5 updates the local service module 102-5 based on the received update in block 700. If the update module 108-5 does not request/receive an update, the local service module 102-5 may receive a future search query in block 702 and perform a search using previously received update data.

Figure 8A:
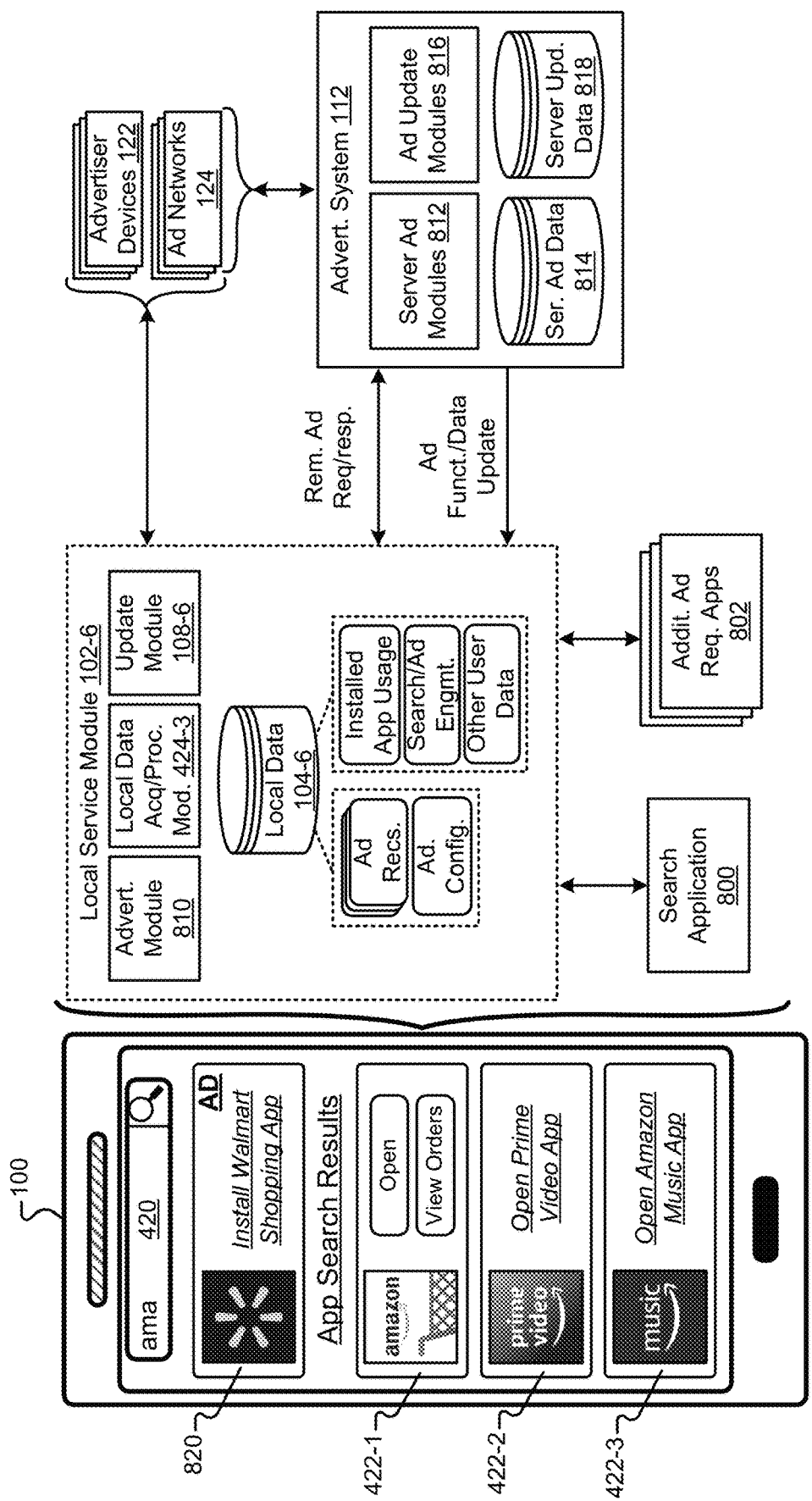
FIGS. 8A-8B illustrate example implementations of a local service module that provides local on-device advertisement functionality.
Figure 8B:
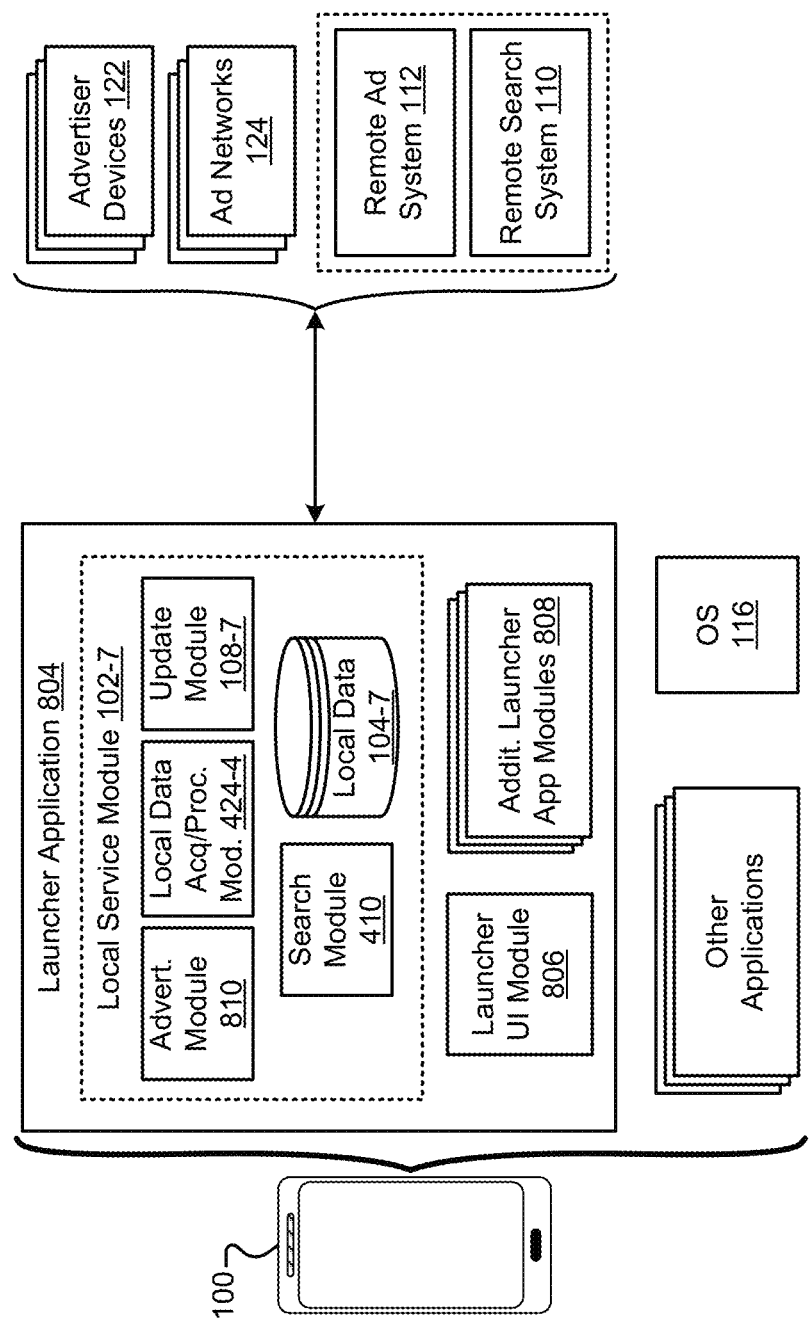

FIGS. 8A-8B illustrate example implementations of the local service module 102 that provide local on-device advertisement functionality. The local advertisement functionality may provide advertisement results based on data stored locally on the user device. For example, the local advertisement functionality may provide advertisement results based on application pages accessed on the device, user search queries, search results, and other parameters. Advertisement results may be referred to as "advertisements," which may be rendered as advertisement links in a GUI, such as a search GUI or application page. FIGS. 8A-8B also include a remote service system (e.g., an advertisement system 112) that may provide updates to the advertisement functionality provided by the local service module 102. Additionally, in some implementations, the advertisement system 112 may provide remote advertisement functionality.

Example advertisements may include application installation advertisements that advertise applications that are not installed on the user device. Installation advertisements (e.g., installation advertisement links) may direct a user to a digital distribution platform for downloading the application. Advertisements may also include re-engagement advertisements that open an application installed on the user device (e.g., to an application homepage or a specific application entity page).

In FIG. 8A, the local service module 102-6 acts as an advertisement service (e.g., a "local ad server") to one or more applications 800, 802 (e.g., a search application 800, web browser, or other application). In FIG. 8A, the applications 800, 802 may make advertisement requests to the local service module 102-6 and receive advertisement responses (e.g., advertisement results) from the local service module 102-6 (e.g., via an interface module). In FIG. 8B, the local service module 102-7 is integrated into a launcher application 804. Additionally, the local service module 102-7 in FIG. 8B includes search functionality, as described with respect to FIGS. 4A-7. The launcher application 804 also includes additional modules that provide functionality associated with the launcher application 804, such as a launcher UI module 806 and other functionality (e.g., additional launcher app modules 808) provided by the launcher application 804.

The local service module 102-6, 102-7 includes an advertisement module 810 ("ad module 810") and local data 104 (e.g., advertisement data and other data) that provide the local advertisement functionality. For example, the ad module 810 may receive an advertisement request and generate an advertisement response (e.g., advertisement results) based on the advertisement request. The advertisement requesting application (e.g., see FIG. 8A) or launcher application modules (e.g., see FIG. 8B) may render the advertisement results in a GUI. The local service module 102-7 of FIG. 8B includes a search module 410 that may provide search functionality described herein. Although the search functionality is not required for generating advertisements, in some implementations, the ad module 810 may provide advertisement results based on a variety of parameters related to search. For example, the ad module 810 may target advertisements based on search results, a user's search query, and/or other search parameters. In some implementations, other search parameters may include algorithmically generated signals associated with search, such as predicted category of search, predicted user intent, etc.

As described herein, the local service module 102 including advertisement functionality may be implemented in a variety of ways, such as a service to applications, or as a component of applications (e.g., an advertisement component of a launcher application). In some cases, the ad module functionality may be described herein with reference to the implementation of FIG. 8B in which the local service module 102-7 is included in the launcher application 804. In these cases, the advertisement functionality provided by the ad module 810 may also be attributed generally to the local service module 102-7 and/or the launcher application 804.

The local service module 102 may receive initial advertisement data from the advertisement system 112 and subsequently update the local advertisement data based on advertisement data updates from the advertisement system 112. The ad module 810 may provide the advertisements based on data stored locally on the user device, such as advertisement content and advertisement targeting parameters. Although the ad module 810 may select advertisements using local data, in some implementations, the ad module 810 may request advertisements from the advertisement system 112. The advertisement system 112 may include server advertisement modules 812 and server advertisement data 814 that provide remote advertisement functionality. The advertisement system 112 may include server advertisement update modules 816 and server advertisement update data 818 that may provide advertisement functionality/data updates.

The environment includes advertiser devices 122 that communicate with the advertisement system 112, such as via a web/application advertising campaign interface. Advertisers may use the advertisement devices 122 to provide advertisement data to the advertisement system 112 using the campaign interface. The environment may also include ad networks 124 that may provide advertisements (e.g., generated by advertiser devices 122) to the advertisement system 112. The advertisement system 112 may then provide the advertisements to the user devices. Although the advertisement system 112 may provide advertisement data to the user devices, in some implementations, advertisers (e.g., advertiser devices 122 and/or ad networks 124) may provide advertisement data to the user devices directly.

Example advertisement data may include advertisement content (e.g., images/text) for generating advertisement results on a user device. Advertisement data may also include advertisement targeting parameters that define when to show the advertisements. For example, the advertisers may specify targeting parameters for advertisements that, when satisfied, may result in the display of an advertisement. Example advertisement targeting parameters may include, but are not limited to, data associated with the search results, an intended application (e.g., a first search result), a user's context (e.g., geolocation, device parameters, etc.), a user's historical web/application usage, and/or the user's current partial/whole search query. The advertisers may also specify bid prices for the query advertisements. The advertisers may also specify limits on how often to show advertisements (e.g., a limit to once per day).

In some implementations, the local service module 102 may personalize the advertisements (e.g., select advertisements based on user data). In some implementations, the local service module 102 may report usage data to the advertisement system 112. Example usage data may include advertisement interaction data (e.g., advertisement viewing/selection).

When advertisement selection is performed locally, the advertisements may be shown to the user immediately, such as in response to search query input and/or in response to accessing an application page. For example, the local service module 102 may provide advertisements in response to the user inputting a single query letter. The local advertisement data, which may be obtained/updated from the remote advertisement system 112, may be used to provide immediate and relevant advertisements.

Additionally, the local user data, such as application installation/usage data, may be used to enhance the personalization and relevance of the advertisements. Using local user data to enhance personalization and relevance may also maintain a user's privacy, as the local data may be maintained on the user device.

The local service module 102 may provide immediate and relevant advertisements in a reliable manner when the advertisements are generated locally. For example, the local service module 102 may provide advertisements regardless of internet connection status. In a specific example, the local service module 102 may provide relevant advertisements when there is no internet connection or a poor internet connection. Although the local service module 102 may provide advertisements locally, in some implementations, the local service module 102 may retrieve advertisements from the remote advertisement system 112.

The launcher application 804 may display one or more advertisements in the search results. For example, the advertisements may be for application downloads (e.g., for applications not installed on the device) and/or links to applications the user has installed on their device. The advertisements (e.g., advertisement links) may include similar data as the search results. For example, a re-engagement advertisement may open an application homepage and/or other application state. As another example, an install advertisement may include access data that accesses a digital distribution platform for downloading the application advertised in the link.

FIG. 8A illustrates an example search GUI that includes an advertisement 820. The example GUI may be generated by an application on the user device, such as a search application, launcher application, or other application. The GUI includes search results that may have been generated as described herein with respect to FIG. 4A. In FIG. 8A, the user enters a partial search query "ama" in the search bar 420 (e.g., text box), which may trigger a search and advertisement. In FIG. 8A, the local service module 102 (e.g., ad module 810) locally selects an advertisement for a Walmart shopping application (e.g., based on targeting parameters and/or scoring). The application (e.g., launcher application) may render the locally selected advertisement. The user may select (e.g., touch/click) the Walmart shopping application advertisement link 820 to access a digital distribution platform and download the Walmart shopping application. In a case where the advertisement is to a specific application state, the user device may be automatically directed to the specific application state after installing and opening the Walmart shopping application.

Figure 9:
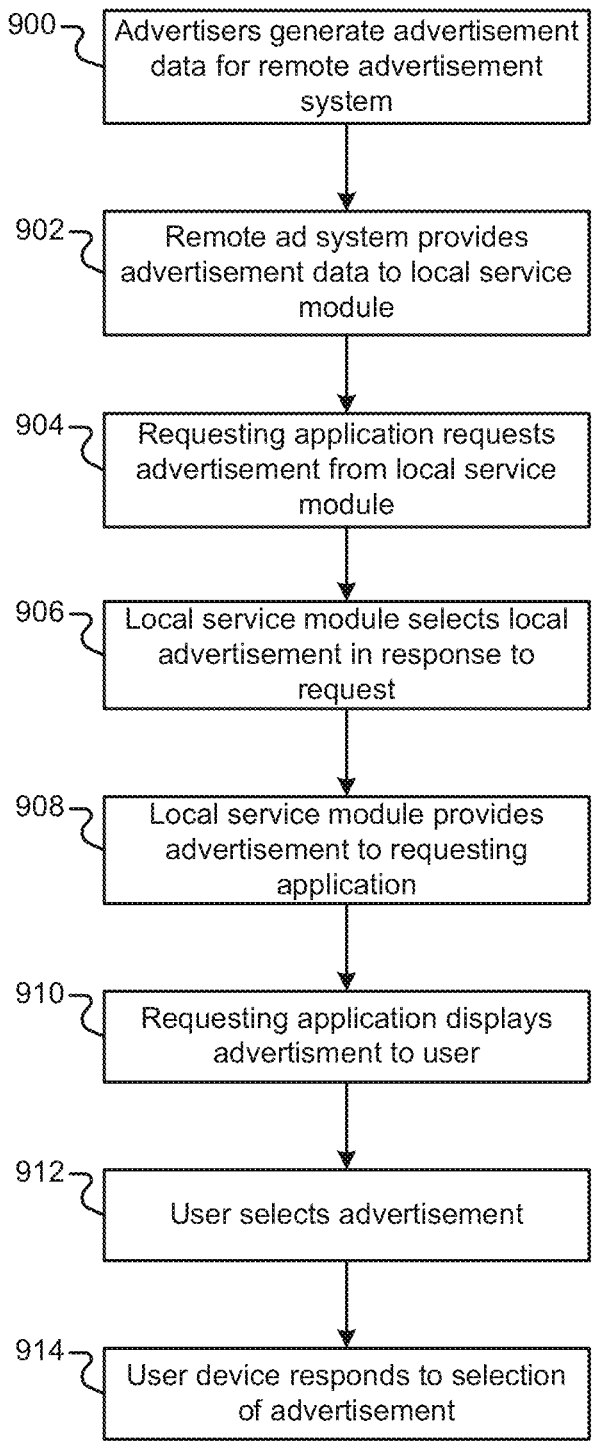
FIG. 9 illustrates an example method that describes operation of a local service module that provides local on-device advertisement functionality.
Figure 10:
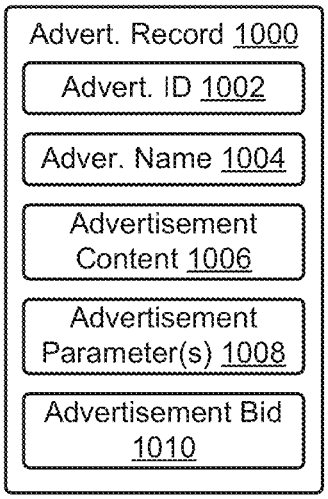
FIG. 10 illustrates an example advertisement record.

FIG. 9 illustrates an example method that describes operation of the environment of FIG. 8A. In block 900, the advertisers use advertiser devices 122 to generate advertisement data for the advertisement system 112. In block 902, the advertisement system 112 provides advertisement data to the local service module 102-6. In block 904, an application (e.g., a requesting application) on the user device requests an advertisement from the local service module 102-6.

The requesting application may generate the local ad request in response to one or more triggers. Example triggers may include a user opening an application, a user accessing a specific state of an application, a user transitioning between application states within an application, and/or another action within an application. In some implementations, the triggers may depend on the type of application. For example, if the requesting application is a search application, the local ad request may be triggered in response to showing a search box and/or executing a search. In another example, if the requesting application is a launcher application, the local ad request may be triggered in response to a user accessing a specific screen of the launcher and/or in response to a user gesture. In some implementations, the requesting application may be configured to generate a local ad request when the user device does not have a sufficient connection to the internet (e.g., to the remote ad system 112). In some implementations, the requesting application may be configured to generate a local ad request when the user device indicates a change in user-state, such as switching from cellular data to WiFi, or if the user becomes stationary after rapid movement (e.g., driving to walking/sitting).

In some implementations, the local ad request may include ad request data that the local service module may use to select advertisements. For example, the ad request may include restrictions on selection of advertisements, such as specific application whitelists/blacklists, application category restrictions, or other restrictions. Using restriction data, the local service module and the requesting application may control the content advertised to the user, such as the applications allowed to be advertised to the user. In some implementations, the ad request may include information provided by the requesting application, such as information about the user. Example information about the user may include user context, such as GPS data, user demographic data (e.g., age or sex), predicted user category or group information (e.g., "is a frequent clicker," likes sports, etc.), information about the requesting application itself, a search query entered by the user, and/or the current content or page being viewed by the user. The local service module may provide more relevant/personalized advertisements to the user based on the additional information included in the ad request. In some implementations, the ad request may include ad rendering information, such as advertisement size (e.g., pixel sizes), color, or other rendering information.

In block 906, the local service module 102-6 (e.g., ad module 810) selects an advertisement in response to the advertisement request. In block 908, the local service module 102-6 provides the selected advertisement to the requesting application. In block 910, the requesting application displays the advertisement to the user. In blocks 912-914, the user selects the advertisement and the user device responds to the selection. For example, the user device may access an application/web page associated with the advertisement. If the advertisement is for downloading an application, the user device may access an application/web page provided by the digital distribution platform for downloading the advertised application.

Referring to FIG. 8A, the ad module 810 may generate advertisements based on local advertisement data and other data, such as locally stored user data (e.g. application/advertisement usage data). The local service module may also include an update module 108-6 that retrieves updates from the advertisement system 112. The updates may modify the functionality of the ad module 810. Additionally, or alternatively, the updates may modify the local advertisement data.

The advertisement data may include advertisement records 1000 (e.g., see FIG. 10) generated by advertisers that interact with the advertisement system 112 (e.g., in an advertisement campaign interface). An advertisement record 1000 may include data associated with an advertisement. For example, an advertisement record 1000 may include advertisement content 1006 (e.g., used to render the advertisement) and targeting parameters 1008 (e.g., used to select the advertisement).

An advertiser may use an advertiser device 122 to define parameters for advertisements included in the advertisement records. For example, the advertiser device may access an advertiser interface (e.g., a web/application-based interface) provided by the advertisement system 112. The advertiser interface may allow the advertiser to define the data associated with the advertisements (e.g., data illustrated in FIG. 8A and FIG. 10).

The advertiser can define the contents of the advertisement (e.g., advertisement content 1006), such as the text and/or images to be included in the displayed advertisement. Example advertisement content may include any of the data described herein, such as app icons and images/text describing an application, application state, webpage, product, or service. In some implementations, the advertiser may specify the action taken in response to selection of the advertisement, such as a URI/URL to be used by the requesting application in response to user-selection of the advertisement. The advertiser may also specify one or more advertisement targeting parameters.

The advertiser may specify a bid 1010 for the advertisement that indicates an amount the advertiser will pay for actions associated with the advertisement. For example, the bid may be an amount for showing the advertisement, selecting the advertisement, and/or performing an action after selecting the advertisement (e.g., installing an application or making a purchase). The advertisement record may also include an advertisement identifier/name 1002 that uniquely identifies the advertisement in the advertisement system 112. The advertisement record 1000 may also include other information that identifies the advertiser, such as an advertiser name and an advertising campaign name 1004.

In some implementations, the advertisement records may include other data associated with the advertisement that may be used to select/score the advertisement. For example, the advertisement record may include advertisement performance data that indicates how the advertisement performed in other scenarios in which the advertisement was shown/selected by other users and/or the user device. As another example, the advertisement record (e.g., advertisement parameters) may include data that indicates the advertisement popularity.

In some implementations, the local service module 102 (e.g., ad module 810 and/or local data module 424) may determine performance metrics and/or perform attribution functions. Example performance metrics may track ad viewing, ad selection, installation of an application, a purchase, and/or other downstream activities associated with selection of an advertisement. In some implementations, the local service module 102 may determine performance metrics and/or perform attribution by monitoring data on the user's device, such as detecting an application was installed. In some implementations, the local service module 102 may receive communications from other applications on the device and utilize this for attribution, improving advertising targeting, and/or automatic generation or updating of advertisements. For example, a shopping application may send a message to the local service module 102 that a user made a purchase. This message may provide information to be used for attribution to an advertisement that was previously shown to the user. In addition, the information may also be used to update on-device models increasing the chance of showing an advertisement. The information may also be used to automatically disable a pending advertisement for the specific shopping app. In some implementations, the local service module 102 may determine performance metrics and/or perform attributions based on data acquired from other sources (e.g., other data providers and/or bundle updates).

The advertisement record may include one or more targeting parameters described herein. In some implementations, a targeting parameter may include an "intended application" targeting parameter that specifies one or more applications that should be identified as intended applications in search results in order to select the advertisement. For example, if Walmart Stores is advertising a Walmart application, the Walmart Stores advertiser may specify that their Walmart shopping application be displayed if the Target shopping application is an intended application in the search results.

In some implementations, a targeting parameter may indicate one or more applications that should be present in search results to trigger the advertisement. The advertiser may further specify that the specified application(s) should show up within the first N search results (e.g., the first 3 search results). In some implementations, a targeting parameter may indicate one or more partial/complete search queries that trigger selection of an advertisement. In some implementations, a targeting parameter may indicate a minimum score associated with a search result (e.g., only consider a search result if it is at least 75% relevant/confident).

In some implementations, a targeting parameter may indicate whether one or more applications should be installed. For example, for a re-engagement advertisement, the application associated with the re-engagement advertisement should be installed. In other examples, the advertiser may indicate that one or more applications should (or should not) be installed. In some implementations, a targeting parameter may be based on application usage, such as how often an application or similar applications are used, when an application was last used, and the user's past engagement with categories of applications (e.g., where applications are associated with categories). In some implementations, a targeting parameter may indicate that the advertisement should be shown if the intended application and/or other applications in the search results correspond to a specific one or more application categories (e.g., restaurants, social media, finance, etc.). In some implementations, a user's behaviors (e.g., app engagement, physical movement, or other behavior) may suggest a user's interests (e.g., a category of interest), such as exercise, health food, or other interest. In these implementations, a targeting parameter may include a user's interests (e.g., as determined based on user behavior).

In some implementations, a targeting parameter may include whether a specific application has been deleted or has never been deleted. In some implementations, a targeting parameter may include a popularity of the application (e.g., based on a number of downloads and/or aggregate usage). In some implementations, targeting parameters may include geolocation of the user, time of day, and user device data (e.g., device type, OS, etc.).

In some implementations, the targeting parameters may specify a number of times the advertisement has been shown and if the user has selected (e.g., touched/clicked) the advertisement and/or installed an application associated with the advertisement. If a user has not selected the advertisement in the past and not installed and/or re-engaged with the advertised application/content, it may be less desirable for the advertiser to show the advertisement.

In some implementations, for re-engagement advertisements, the targeting parameters may include when and how often the application was used in the past and when the application was installed. In some implementations, a targeting parameter for re-engagement may include a popularity of the application page to which the advertisement directs the user device.

In some implementations, targeting parameters may include an amount of time spent by a user in the applications. For example, a targeting parameter may indicate that an advertisement should be selected if the user has spent greater than a threshold amount of time in one or more applications. In some implementations, targeting parameters may include specific times of day, days of the week, or other times at which the user has performed, or typically performs, actions within the applications. In some implementations, the targeting parameters may be based on application-specific data provided by specific applications to the local service module 102. For example, an application may provide data about a specific user's usage patterns within their application or specific user content-engagement information, such as whether a user "likes pets" in the application.

The ad module 810 selects one or more advertisements (e.g., for insertion into an application page, webpage, or search results). The ad module 810 may implement one or more configurable advertisement selection functions that select advertisements (e.g., ad records) based on targeting parameters and/or other ad scoring/selection parameters described herein. For example, the ad module 810 may select one or more advertisements that satisfy targeting parameters. In some implementations, the ad module 810 may identify an initial set of advertisements based on targeting parameters. The ad module 810 may then select one or more final advertisements (e.g., for the search results) based on additional factors, such as an advertisement bid price and/or expected interaction with the advertisement (e.g., user selection, app installation, etc.). In some implementations, the ad module 810 may score the initially identified set of advertisements and select the advertisement(s) with the highest score(s) (e.g., ad relevance scores).

The ad module 810 may include an ad candidate selection module ("candidate selection module"), an ad scoring module, and an ad selection module. The candidate selection module may select an initial set of candidate advertisements based on the satisfaction of targeting parameters. The ad scoring module may score the candidate advertisements. The ad selection module may select one or more of the candidate advertisements (e.g., for inclusion into search results) based on the scores associated with the candidate advertisements. For example, the ad selection module may select the highest scoring ad(s) (e.g., for inclusion in search results). In the case advertisements are inserted into search results, advertisements may be referred to as "advertisement results."

The ad scoring module may implement an ad scoring function and/or ad scoring model (e.g., a machine learned model) that scores the candidate ads. The scores associated with the candidate advertisements may indicate the relevance of the advertisements to the search results, search query, and/or other data (e.g., installation/usage data). The ad scoring module may score the advertisements based on any of the ad targeting parameters and/or application engagement parameters (e.g., aggregate/personal usage) described herein. In some implementations, the ad scoring module may score the advertisements based on device factors, such as battery level and/or network status.

In some implementations, the ad scoring module may generate scores based on the bid price and/or expected interaction with the advertisement (e.g., ad selection and/or app installation). In some implementations, the ad scoring module may generate a score based on the expected value of the advertisement. An expected value may be calculated by multiplying the bid price by a probability that the advertisement performs in an expected fashion, such as driving the user to select the advertisement, install an application based on the advertisement, and/or make a purchase based on the advertisement.

Example additional advertisement scoring features may include previous engagement data by the user with the advertisement (e.g., number of times shown, selected, etc.). Additionally, or alternatively, some systems may collect aggregated user behavioral data and associate this with advertisement metadata, such as average CTR for the advertisement for other users. Ad scoring features may also include popularity of the advertised application (e.g., Walmart may be more popular than a much smaller shopping application). Ad scoring features may also include personal user engagement data for the user with the intended application, the considered advertisement (e.g., if the ad is a re-engagement advertisement), and/or the category of the application (e.g., the user may use shopping apps 10 times a week). Ad scoring features may also include user search behavior, such as whether the user has searched for "sneakers" in the past and whether the application specializes in selling sneakers. In some implementations, ad scoring features may take into account the time of day and related performance of a category for that time of day. For example, shopping apps may be more popular in the late evening, while weather applications may be more popular in the morning. Other ad scoring features may include the age of the advertisement data, such as when the data was last updated. For example, older data may be associated with a lower score, which may favor newer advertisements. In some examples, ad scoring features may also include advertiser budget (e.g., an amount spent and/or a remaining budget).

Although the ad module 810 may score advertisements for selection, in some implementations, the ad module 810 may not score advertisements. Instead, the ad module 810 may implement other ad selection rules, such as selecting the most popular advertisement, the highest performing advertisement, the advertisement associated with the most popular application, the advertisement associated with the most popular search result, etc. The aggregate ad performance and other popularity metrics may be acquired/updated from the advertisement system 112.

In some implementations, the ad module 810 may filter ads based on the installation status of an application. For example, the ad module 810 may remove installation ads for applications that are installed. The ad module 810 may also remove re-engagement ads for applications that are not installed.

As described herein, the ad module 810 may access user data that the ad module may use to identify/score advertisements for selection. In some cases, the user data described herein may also be integrated into the advertisement records. The user data may include data indicating how the user interacted with previous advertisements. For example, the user data may indicate a number of views for each advertisement, whether an advertisement was selected, and other data associated with the views/selections, such as the data associated with the search that yielded the results and the ad parameters used for selection of the advertisements. The user data may include time stamps for any of the events described herein, such as time stamps for application installation/usage, searching, and/or advertisement viewing/selection.

The local service module 102 may update its advertisement functionality (e.g., ad identification, selection, and scoring functions) and data (e.g., ad data and user data) over time. The local service module 102 may include an update module 108 that updates the advertisement functionality and data for the local service module 102. The update module 108 may acquire updated advertisement functionality and advertisement data from the advertisement system 112. Example updated advertisement data may include any new/modified advertisement data described herein (e.g., in the advertisement records), such as new advertisements and new targeting parameters.

In some implementations, the local service module 102 may report application usage, search usage, and/or advertisement viewing/selection data to the advertisement system 112 so that the advertisement system 112 may update respective aggregate data. In some implementations, the local service module 102 may report application usage, search usage, and/or advertisement viewing/selection data to the advertisement system 112 using a form of privacy-enhancing technology, such as differential privacy, federated learning, and/or local-aggregation. In some implementations, the update module 108 may make update requests to the advertisement system 112 at various times, such as periodically and/or after a threshold amount of time has passed since a prior update. In some implementations, the update module 108 may be configured to acquire updates in response to resuming a previously disconnected/slow internet connection.

The update module 108 may generate an update request that is personalized, such as requests for updates for installed applications and advertisements that are relevant for the installed applications. In some implementations, the updates may be "deltas" that are limited to changes since a last update, such as ad records for newly installed apps and/or data that has been updated at the advertisement system 112 since the last update. In some implementations, the updates may be tailored toward specific geolocations or other data. In some implementations, the advertisement system 112 may determine and/or predict which applications are installed on the user device. For example, the user device may send a list of installed applications and/or data that allows the advertisement system 112 to predict which applications are installed (e.g., a query history). In some cases, the advertisement data may not be personalized to the user. In some implementations, the local data may be subject to expiration dates/times (e.g., advertisement expiration dates).

In some implementations, the advertisement system 112 may push the updates to the user device. The updates may also be affected by battery level and/or network status. For example, a decision to request an update may have update criteria, such as a threshold battery level and/or connection level.

The local service module 102 may modify behavior based on the internet connection status. For example, some advertisement records may include metadata that indicate that the ads should be shown based on the state of the internet connection. For example, specific re-engagement results (e.g., advertisements) may require an internet connection to be shown. As another example, some application advertisements may provide a delayed installation when there is no current internet connection (e.g., install later when connected).

Although the advertisement system 112 may provide data for use in local advertising on the user device, in some implementations, the advertisement system 112 (e.g., server ad modules 812 and data 814) may provide advertisements to the local service module 102. For example, the local service module 102 may retrieve advertisements from the advertisement system 112. The advertisement system 112 may generate advertisements using similar operations as the local service module 102 (e.g., identification/scoring/selection operations). In some implementations, the local service module 102 may retrieve advertisements from the remote ad system 112 as a fallback when sufficiently relevant advertisements are not available locally. In some implementations, the local service module 102 may provide local advertisements in the case that the remote advertisement system 112 is not available due to a poor/unavailable internet connection. In some implementations, the local service module 102 may receive results form a remote advertisement system 112 and compare scores to decide which, if any, advertisements to show.

Figure 11:
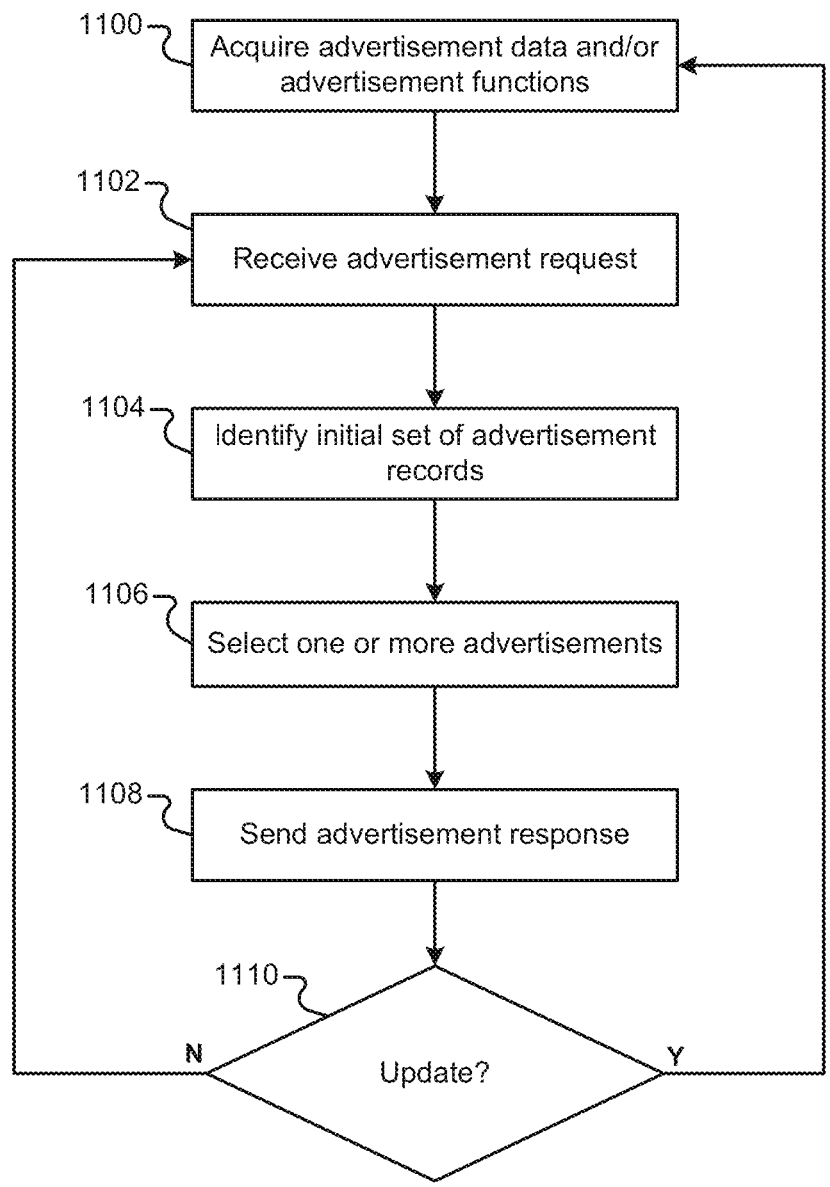
FIG. 11 illustrates an example method that describes operation of a local service module that provides local on-device advertisement functionality.

FIG. 11 illustrates an example method that describes operation of the local service module 102-6 of FIG. 8A. In block 1100, the local service module 102-6 (e.g., update module 108-6) acquires advertisement data/functions from the advertisement system 112. In block 1102, the local service module 102-6 receives an advertisement request from a requesting application. In block 1104, the ad module 810 selects an initial set of candidate advertisements based on targeting parameters. In block 1106, the ad module 810 selects one or more final advertisements from the candidate advertisements (e.g., based on scores associated with the advertisements). In block 1108, the local service module 102-6 sends a response including the selected advertisement(s) to the requesting application. In block 1110, the update module 108-6 determines whether to update the advertisement data. If the update module 108-6 requests/receives an update, the update module 108-6 updates the local service module 102-6, such as the ad module 810 and/or ad data based on the received update in block 1100. If the update module 108-6 does not request/receive an update, the method continues in block 1102.

Figure 12:
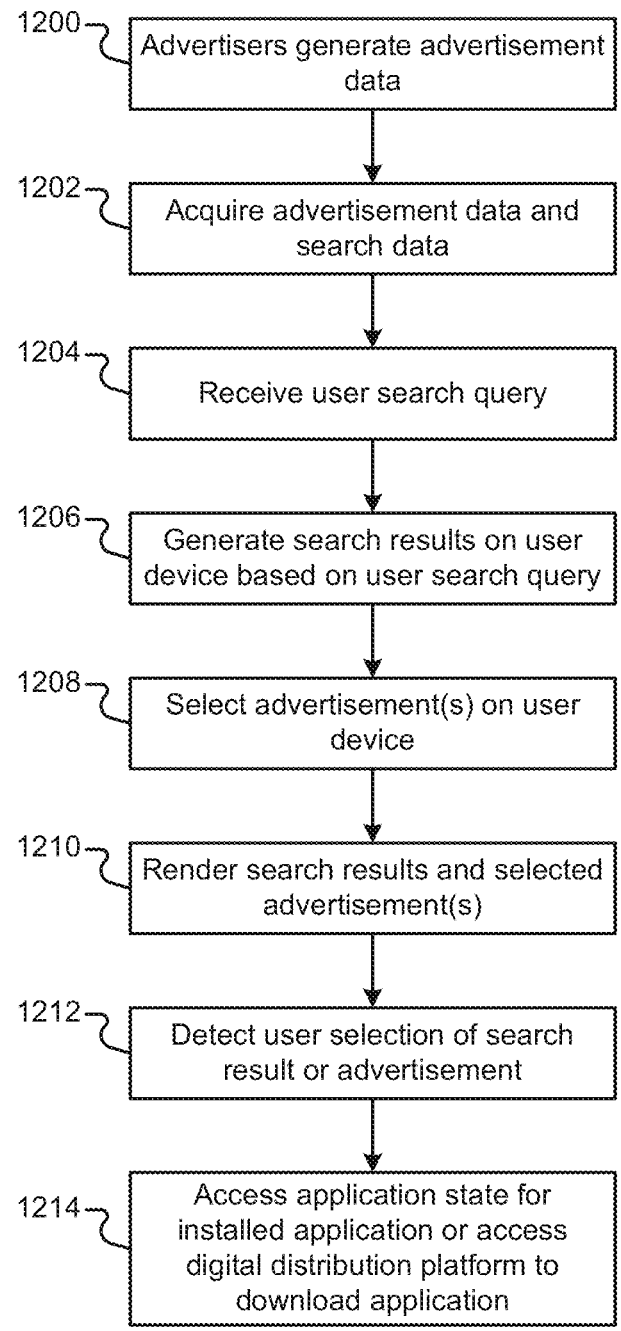
FIG. 12 illustrates an example method that describes operation of a local service module that provides local on-device search and advertisement functionality.

FIG. 12 illustrates an example method that describes operation of the launcher 804 in FIG. 8B. In FIG. 8B, the launcher 804 includes a local service module 102-7 that provides local search and advertisement functionality. The launcher 804 may generate a search interface that provides search results and advertisements (e.g., see the GUI of FIG. 8A).

In block 1200, the advertisers may use advertiser devices 122 to generate advertisement data in the advertisement system 112. In block 1202, the local service module 102-7 may acquire the advertisement data and search data. In block 1204, the local service module 102-7 receives a user search query (e.g., entered into a launcher search GUI). In block 1206, the search module 410 may generate search results (e.g., local results) based on the user search query.

In block 1208, the ad module 810 may select one or more advertisements based on any of the advertisement targeting parameters described herein. For example, the ad module 810 may select one or more advertisements based on search result data, user data (e.g., previous ad engagement data, context, etc.), or other parameters. Although the ad module 810 may select one or more advertisements for each search results page, in some cases, the ad module 810 may not identify any advertisements that should be shown for the search results page (e.g., when no advertisements satisfy targeting parameters).

In block 1210, the launcher 804 renders the search results and the advertisement(s) in the search GUI. In some implementations, the launcher 804 may render the search results and advertisement(s) at the same time. In other implementations, the launcher 804 may render the search results prior to identifying an advertisement (e.g., while an advertisement is being selected). The local selection of an advertisement on the user device may occur fast enough that a user may not differentiate between simultaneous rendering of advertisements and search results versus subsequent rendering of the advertisement(s). In block 1212, the launcher 804 detects user selection of a search result or advertisement. In block 1214, the user device may access an application state or access a digital distribution platform in response to selection of the search result or advertisement.

In some implementations, the local service module may generate local data (e.g., local search/advertisement record data) to be used for local functionality (e.g., search/advertisement). In one example, the local service module may utilize determined user behavior to generate additional local data. For example, the local service module may generate search/advertisement data based on user behavior, such as interaction with the search (e.g., search queries, result selection, etc.), advertisement engagement (e.g., ad selection, impressions, etc.), or other user actions on the user device. The locally generated data may be used to provide/enhance the functionality described herein, such as search/advertisement selection/scoring. The local data may be generated based on positive user actions, such as user engagement with search functionality, advertisements, or other local service module functionality. Local data may also be generated based on other user behavior, such as refraining from engagement (e.g., not selecting an advertisement) or interacting with the user interface in another manner (e.g., scrolling, swiping, etc.).

The search functionality (e.g., search record identification, scoring, and filtering functions), advertisement functionality (e.g., ad identification, selection, and scoring functions), search data (e.g., app lists/metadata and search records), and advertisement data (e.g., ad records) described herein are only example functionalities and data that may be included in a local service module 102. As such, additional/alternative functionalities/data and different arrangements of functionalities/data may be implemented by the local service module 102 than those functionalities and data explicitly described herein.

FIG. 13 illustrates an example launcher application 1300 including a local service module 102-8. The local service module 102-8 may provide a variety of functionality to a user. Example functionality may include, but is not limited to: 1) local/remote search functionality, 2) local/remote advertising functionality, 3) additional functionality (e.g., zero state functions, shortcuts, autosuggest, etc.), 4) local data acquisition and processing, and 5) update functionality.

The additional modules in FIG. 13 may provide the additional functionalities. The additional functionalities may include, but are not limited to: 1) application name intent search, 2) shortcuts into applications, 3) zero state functionality, 4) suggested application functionality, and 5) autosuggest functionality. In a manner similar to the local search and advertising functionality, the additional functionalities may include local functionality that may: 1) have access to personal data on the user device, 2) provide a fast local response without a network connection, and 3) be integrated into the user device such that the functionalities have special privileges (e.g., priority execution).

In some implementations, the local service module 102-8 may include application name intent search functionality that determines, based on a partial/complete query, that the user is looking for a specific application or application(s). In some cases, the local service module 102-8 (e.g., a shortcuts module 1302) may include shortcut link functionality that provides shortcut links into applications. Shortcut link functionality may identify, based on a partial/complete query, a list of deeplinks into applications that may be of interest to the user. Shortcut links may be generated in a variety of ways. In some implementations, shortcuts may be provided by developers. For example, developers may provide shortcut links into the application prior to downloading the application (e.g., in the application package Android .apk file). As another example, developers may provide shortcut links in updates. In some implementations, shortcut links may be automatically generated. For example, shortcut links may be automatically selected links based on popularity. In another example, shortcut links may be generated based on personal usage (e.g., commonly used application states). In examples where the shortcut links are generated automatically, the shortcut links may be dynamically generated as the application is used. For example, new/old shortcut links may be added/removed based on the application links accessed by the user. In some implementations, shortcuts may be provided by running apps recording a deeplink into the OS 116 or directly to the local service module 102-8.

In some implementations, the local service module 102-8 (e.g., zero state module 1304) may provide zero state functionality. Zero state functionality may refer to functionality that is provided to the user in response to a zero state trigger (e.g., other than a user search query). Example zero state triggers may include, but are not limited to, a user gesture in an application (e.g., a user swipe), a user accessing a specific page of an application (e.g., a specific launcher page), a predetermined time of day, a predetermined geolocation of the user, and/or a user "waking up" the phone (e.g., movement after the phone has laid still). In some implementations, accessing a page including a search query box may trigger zero state functionality prior to a user entering a search query.

In some implementations, the local service module 102-8 may provide zero state links and/or zero state search queries (i.e., query hints). Zero state links may refer to user-selectable links that access application states/pages in response to user selection. Zero state search queries may refer to user-selectable search queries that act as an entered search query in response to user selection. In some implementations, the local service module 102-8 may provide zero state links using search functionality described herein without a search query. For example, the local service module 102-8 may perform a search based on user context (e.g., location, time of day, etc.) and other user data, including previous search activity and/or application usage. Zero state search queries may be provided to the users based on curated lists of query hints, prior application usage (e.g., previous search queries, link selections, etc.), or other factors. In some implementations, a zero state search query list may be displayed in response to showing a search box.

In some implementations, the local service module 102-8 (e.g., suggested apps module 1306) may provide suggested application functionality (e.g., in response to a zero state trigger). Suggested application functionality may include providing a user with a list of suggested links to applications to open based on a variety of factors. Example factors for showing suggested applications may include, but are not limited to, application popularity, other aggregate application data, personal application usage (e.g., show more highly used applications), time of day (e.g., show applications typically used at the time), recent queries, network status (e.g., show streaming applications when the user is connected to an unmetered WiFi), and geolocation (e.g., show applications typically used in the location). In some implementations, the suggested applications may be limited to installed applications. In other implementations, the suggested applications may include applications that are not currently installed on the user device. In some implementations, advertisements may be shown alongside suggested apps. In some implementations, potential revenue (e.g., application developers paying for installation or re-engagement) may influence ranking. The data used to generate suggested application links may be stored locally and updated by the remote service system 106-4. In some implementations, the data used to generate suggested application links may be generated locally (e.g., originate on the user device).

In some implementations, the local service module 102-8 (e.g., autosuggest module 1308) may include autosuggest functionality. Autosuggest functionality may provide a list of user-selectable autosuggest queries (e.g., under a search box) in response to user input of a partial/complete query. The local service module 102-8 (e.g., search module 410) may perform a search using the selected autosuggest search query. The local service module 102-8 may generate candidate autosuggest queries locally (e.g., based on local data) and/or acquire the candidate autosuggest queries from a remote search system 110. In some implementations, the local service module 102-8 (e.g., the autosuggest module 1308) may rank the candidate autosuggest queries based on local data (e.g., a correlation between prior queries and the currently entered query).

The local service module 102 may include a local data acquisition and processing module 424-1, 424-2, . . . 424-6 (generally referred to herein as "local data module 424") that may acquire and process data locally on the user device. The acquired data may include a variety of events on the user device, such as user interactions with the local service module 102, the launcher, and/or one or more other applications on the user device. Example events may include UI events (e.g., user gesture inputs and other GUI interactions), search events (e.g., search query inputs, results, result selection), advertisement events (e.g., ads shown/selected), application events (e.g., installations, opens, uninstallations), web events (e.g., webpage interactions), additional function events (e.g., zero state interactions, app name intents, shortcut selections, suggested apps, autosuggest events, etc.), and other events that occur on the device. The local data 104 may store some of the data for use in personalization of search, advertisement selection, and additional functions. The local service module 102 (e.g., local data module 424) may also provide the event data to a remote service system 106 (e.g., search system 110, advertisement system 112, analytics system 1310, etc.), which may provide analytics services, such as updating various data in the remote service system 106.

Acquired events may include event data that is descriptive of the event. For example, the event data may indicate the application associated with the event (e.g., an application name), a type of event (e.g., a search event, advertisement event, etc.), as well as the time at which the events occurred. Some example event data may include query history data (e.g., previously entered queries), search result selection data, and advertisement interaction data (e.g., advertisement viewing/selection). Additional example event data may include user interaction with the UI (e.g., a launcher UI), such as scrolling events or dwell time.

In some implementations, some applications may include modules (e.g., SDKs) that provide event data to the local service module 102. For example, the applications, or the OS, may provide event data that indicates various actions within the applications (e.g., application opens, application closes, commerce events, and/or custom developer defined events). In implementations where applications include modules that report event data to the local service module 102, the local service module 102 and the modules included in the applications may be developed by the same party (e.g., the same business).

The extent to which the local data module 102 acquires data may be configurable and updateable. For example, different implementations of the local service module may acquire and process events to different extents. Furthermore, the event types and the amount of data acquired may be configurable. In one example, different OEMs may acquire event data for different event types and/or acquire different amounts of data.

In some implementations, the local service module 102 may report event data to the remote service system 106 and/or an analytics system 1310 (e.g., see FIG. 13). The remote service system(s) 106 may provide remote functionality (e.g., search results and/or advertisements) based on the acquired data from one or more users. In some implementations, the remote service system 106 may provide update data to the local service module 102 based on user/aggregate acquired data. The extent to which the local data is provided to the remote service system 106 may be configurable. For example, different implementations of the local service module may provide different types of events and different amounts of data to the remote service system 106. In some implementations, the analytics system 1310 may be separate from the other remote service systems (e.g., separate from the search/ad systems). Although the analytics system 1310 may be separate from the remote service systems 106, in some implementations, the analytics functionality may be integrated into the remote service system 106.

In some implementations, privacy-enhancing technologies may be implemented to protect user privacy. For example, differential privacy, secure aggregation, and/or hashing may be used to convert the raw analytics data into a form that reduces the possibility of associating the data to the user's device.

In some implementations, the analytics system 1310 may utilize store-and-forward caching technology to accumulate multiple event messages prior to communicating the data to the remote service system 106. In some implementations, the analytics system 1310 may use counts of already consumed bandwidth to decide when to communicate with the remote service system 106. In some implementations, the analytics system 1310 may modify the data communicated to the remote service system 106. For example, if a user had made 1000 clicks in the previous day, the analytics system 1310 may choose to only send the last 10. In another example, if the user is roaming, the analytics system 1310 may only send aggregated data, such as clicks on the most popular application for the user.

In some implementations, the analytics system 1310 may utilize compression algorithms to reduce communicated data. In some implementations, the analytics system 1310 may use cryptography to prevent unauthorized individuals from viewing the user logs.

The modules included in the local service module 102 may represent functionality associated with the local service module 102. For example, the search module 410 and the ad module 810 may represent search and advertisement functionality, respectively. In some implementations, the modules include defined software components. For example, the local service module 102 may include defined software components that were defined during installation of the local service module or other application including the local service module. The local service module components (e.g., modules) may be updated, such as by software updates from the digital distribution platform 118. As described herein, some modules included in the local service module (e.g., search and ad modules 410, 810) may have configurable/modifiable functionality in addition to the defined software components. The configurable functionality is illustrated as configuration data in FIG. 4A and FIG. 8A. The configurable functionality may be stored in the local data 104. As described herein, the configuration data for the different local service modules may be updated (e.g., by received update bundles requested by the update module 108). The updates may update configuration functionality (e.g., search/ad algorithms) and/or other data (e.g., search/ad records).

In some implementations, the configuration data may include limited sets of operations, such as a set of data generation and manipulation commands. The limited sets of operations may be enforced for the purpose of software security. Example operations may include, but are not limited to: read/writes and structural data changes (e.g., schema changes), such as create a table, delete a table, modify a table, insert/delete/update/modify values or rows, or build indexes. In a specific implementation, structured query language (SQL) (e.g., SQL commands), other languages, and/or full custom commands may be used. Specific data manipulation commands may include updating popularity scores for search, deleting records, and changing SQL queries for search. In some implementations, the search algorithms may be SQL queries, where the SQL query and its bindings are specified in the data store. For example, an app name search function may select all applications that begin with the user's query (e.g., "select*from local_app_data where app_name like '<user_query>%'"), and the ranking may be based on some local or other data, such as "order by last_time_opened desc". The specific SQL query can be updated by an update bundle to modify the functionality (e.g., use a different column for ranking or a different matching filter). In some implementations, a scoring or ranking function may be parameterized and the parameters and their weights may be specified in the data store and updated by the bundles. Although, in some implementations, the configuration data may not change operation of the defined software components of the modules, in other implementations, configuration data may include configurable software components.

The remote service system 106 may send updates to the local service module 102, such as in response to a request received from the update module 108. Update data may be included in an update data structure that may be referred to herein as an "update bundle" or a "bundle." The update bundle may include updated data to be included in the local data, such as updated search data (e.g., search records, lists, etc.), advertisement data (e.g., ad records including possible combinations of query, user, ad, CTR estimation, bid), and other data. The update bundle may also include updated configuration data (e.g., data manipulation commands) that may be used by the different modules (e.g., the search module 410 and/or ad module 810). Accordingly, operation of the local service module 102 and the data upon which the local service module 102 operates may be configured based on the received update bundles. Providing update functionality may help ensure relevant search results, advertisements, and other new functionality can be provided to an installed local service module over time. In some implementations, the updates may be user-specific (e.g., personalized), such that different devices may receive different updates. In other implementations, the updates may not be user-specific (e.g., general update bundles). In some implementations, the updates may be dependent on anonymous data from the device, such as the current user's region or country or language settings. In some implementations, the updates may be organized into groups, such that all of the users in the same group receive the same update. For example, a group may be a region, an OEM, a carrier, a phone model, or other group. In some implementations, a specific combination of properties of the device and user-context may be used to determine the bundle (e.g., a user country and device type). In some implementations, the bundle may be a combination of partial bundles based on groups. For example, a user may receive part of their bundle based on their region and part of their bundle based on the OEM.

The local service module 102 may be installed with an initial configuration (e.g., default/fallback behavior) in which the modules may include defined software component functionality. Additionally, the data (e.g., search data, configurable data, etc.) included in the local service module 102 may be in an initial configuration. The local service module may be configured to request an update from the remote service system 106 upon initial startup. After updating to a current configuration, the local service module 102 may operate according to updated data (e.g., updated search data, ads data, configurable data, etc.). In some implementations, the modules may include defined fallback functionality, such as defined fallback search and advertisement functionality. The local service module 102 (e.g., one or more included modules) may use the defined fallback functionality in cases where the updates, or other features, are not working properly.

In some implementations, the local service module 102 or other application may place restrictions on the usage of data between different components in order to maintain user privacy and application-specific data separation. For example, in some implementations, the local service module 102 may prompt a user to give permission for logging user data and maintaining analytics. Additionally, the local service module 102 may place restriction on the usage of data for searching and advertising. For example, the local service module 102 may limit the usage of data across applications for advertising and/or searching. In a specific example, in some cases, user data for one application may not be used to target advertisements for another application.

In some implementations, the update module 108 (e.g., a bundle manager of FIG. 15) may make a request to the remote service system 106 for an update bundle. In some implementations, the update module 108 may include a device/user ID in the request and/or indicate a bundle ID that is currently in use. In some implementations, the update module 108 may include additional metadata about the bundle, such as bundle last-updated time. In some implementations, the update module 108 may include additional metadata about the user or device, such as the user's current geolocation, language settings, etc. In some implementations, the update module 108 may include locally generated data, such as predicted user categories (e.g., the user likes games). The remote service system 106 may send an update bundle to the user device in response to the request. The update module 108 may integrate the updated bundle data into the local service module 102.

The local service module 102 may have a variety of functionality provided upon installation. In some implementations, updated bundles may provide additional functionality. In one example, an update bundle may add new services/features, such as new search/ads features, new zero state services/features, query hint services/features, and/or auto-suggest services/features. For example, the update bundle may indicate how to generate search results, how to render results/ads, and how to trigger zero state functions.

FIG. 14 illustrates an example remote service system 106-5 that may provide updates to the local service module 102. Select components of the remote service system 106-5 are illustrated in FIG. 14 for description purposes. As such, additional/alternative modules and data stores not included in FIG. 14 may be included in the remote service system 106. The remote service system 106-5 may include a plurality of server data stores, such as a server search data store 418, a server ad data store 814, and a server update data store 1400. The data stores included in the remote service system 106-5 may include any of the data described herein that is sent in updates to the user devices. For example, the server data stores may include search data (e.g., search records, lists, etc.), advertisement data (e.g., ad records), and other data (e.g., zero state data, query hint data, etc.). The server data stores may also include configuration data (e.g., the data manipulation commands) that may be used by the local service module 102.

The remote service system may include server update modules 1402, such as server data generation modules 1404 ("data generation modules 1404") that generate data included in the server data stores. For example, the data generation modules 1404 may generate the server search data 418, server ads data 814, and other server data. In some implementations, the data generation modules 1404 may generate aggregate data (e.g., other server data) based on acquired user/analytics data. The remote service system 106-5 may include data for advertisements and for a large set of applications, some of which may be installed on each of the user devices. The remote service system 106-5 may include an update bundle generation module 1406 ("bundle generation module 1406") that generates bundle data for updates. The bundle data may be stored in the bundle data store 1408. The bundle data store 1408 may also include bundle metadata that indicates the content of the bundles and history of the bundles (e.g., bundle dates, updated data, etc.).

In some implementations, the bundle generation module 1406 may generate personalized update bundles for users based on a variety of parameters, such as a list of installed applications on the user device and/or application/advertisement engagement on the user device. In order to personalize a bundle, the remote service system 106-5 may use a received user/device ID in the bundle request that uniquely identifies the user/device and associated server data. In some implementations, update bundles may be less personalized. For example, general bundles may be generated and stored over time that include updated data. The bundle generation module 1406 may send new general bundles in response to an update request.

In some implementations, the bundle generation module 1406 may optimize the size of bundles by dynamically generating bundles that include mostly/only data that is different than a currently used bundle. The bundle generation module 1406 may determine the contents of a currently used bundle on a user device based on a bundle ID and/or other bundle metadata indicating the contents of the currently used bundle, such as the device reported last update bundle timestamp. In some implementations, the bundle generation module 1406 may specify that a user device is assigned to an experimental group by adding information to the bundle-id or bundle metadata. In some implementations, the bundle generation module 1406 may optimize (e.g., minimize) the size of a bundle in response to bandwidth restrictions. In some implementations, the bundle generation module 1406 may remove data, or refrain from sending some data, in order to minimize bundle size. In some implementations, the bundle generation module 1406 may utilize compression, including the use of a shared dictionary between the device and the server. In some implementations, the bundle generation module 1406 may encrypt each bundle using a key or secret shared, or only known by, the device.

The remote service system 106-5 may include a communication module 1410 that provides the bundles to user devices. For example, the communication module 1410 may receive update bundle requests from user devices and provide update bundles to the user devices in response to the requests. Additionally, or alternatively, the remote service system 106-5 may push updates to the user devices. In some implementations, the remote service system 106-5 may assign specific user or device IDs to an experimental group. The bundle requests may specify any previously assigned experimental groups to the remote service system 106-5 to ensure the correct data associated with the assigned experimental group is sent.

The local data module 424 may log user interaction data, generate analytics data, and provide the analytics data to the analytics system 1310 and/or the remote service system 106. Example analytics may include, but are not limited to, search analytics, ads analytics, UI analytics (e.g., user inputs), device analytics (e.g., connection/battery status), and other services analytics. Analytics may include logs of any event described herein, such as any events acquired by the local data module 424, as well as other modules (e.g., zero state, query hints, and autosuggest). In some implementations, the analytics may also include logged error events. In some implementations, the local data module 424 may compress or aggregate the analytics data for transfer. In some implementations, the local data module 424 may receive device events, such as the user has enabled WiFi, or the user has changed their device language or default region. In some implementations, the local data module 424 may utilize privacy enhancing algorithms, such as differential privacy, secure aggregation, and/or hashing.

The analytics system 1310 and/or remote service system 106 may receive analytics from the user devices, the search system 110, the advertisement system 112, and/or the third party data providers 126. The analytics system 1310 may also provide analytics data to the remote service system 106 (e.g., the search system 110 and/or the advertisement system 112). The remote service system 106 may update the server data described herein based on the analytics data and other user data.

FIG. 15 is a functional block diagram of an example architecture for a local service module 102-9, such as a local service module implemented in a launcher application. The example functional block diagram of FIG. 15 illustrates example components of the local service module 102-9. For example, the example architecture may include: a bundle manager module 1500 (e.g., a loader/processor), a local data module 424-6, a local query execution engine 1502 (with fallback), an analytics event processor 1504, a local query store 1506, a local (private) data store 1508, server synced data 1510, and one or more bundles. In some implementations, a bundle may include a collection of SQL commands to be executed on the user device. The local service module 102-9 may include a "bundle request event," such as a timer, or it may be event or schedule driven. The bundle manager 1500 may make a request (e.g., via the Internet) to the remote service system 1606, which may respond with one or more bundles.

In some implementations, the bundle manager 1500 may set timers or scheduled reloads based on the received bundle (e.g., the received bundle may request it be re-loaded in 24 hours). There may be multiple bundles, each for different services (e.g., ads, app-search, zero state, hints, etc.). Each separate service may have its own independent schedule for loading/requesting bundles. Each loaded bundle may be executed as a transaction. If there is a failure, the server synched state may be reset to before the bundle load was started, preventing corruption. The bundles may determine the server synched data and the contents of the local query store.

The local service module 102-9 may generate local private data based on various events or queries to local OS functions. An event or request may provide raw data as input to the local data module, which may process this data and generate/update local private data. User actions associated with the local service module or other applications, such as entering a query, clicking a result, scrolling action, and/or other actions may trigger the local data module 424-6 to create appropriate records in the local data. For example, if a user clicks a result in the search, or enters a query, the local data module 424-6 may update the private tables, such as storing (adding to) the click and search history.

In some implementations, events (e.g., system/device events) may trigger the local data module 424-6. For example, if a user installs an application, this may trigger a system event, which may activate the local data module to update a local table corresponding to installed packages. The local data module may update local data with the install-time, display name of the application, and the normalized name, which may be generated from the display name. In addition to events triggering the local data module 424-6, the local service module 102-9 may periodically (event driven or scheduled) query system/OS functionalities. For example, each time the user opens an application (e.g., a launcher application) or uses a specific gesture, the local service module may request the most recent data about installed applications. This may allow the local service module to ensure the most recent information is always available and current.

The local query store 1506 may be used to determine the search behavior for various on-device functions. Each entry in the local query store may specify an id, such as "local search" or "ads," a "query" (e.g., SQL), and a specified set of bindings. When a user event (e.g., search, open of search application, etc.) triggers a search (e.g., an app-name search, a zero-state opportunity, hints opportunity, ads opportunity, etc.), the query execution engine 1502 may load the corresponding query from the local query store 1506 (e.g., a specific SQL query and the bindings). Bindings may be an array of "key names," where the key names may refer to properties of the user, search, and/or device context. The order may be based on their relative position in the SQL query to be executed. For example, if a user opens the virtual keyboard and types 'AMa', this may trigger an app-name search and a query-based ads-search. The app-name search may load a SQLite query corresponding to the id "app_name_search" and bindings such as (normalized_user_query, normalized_user_query, normalized_user_query, geo_lat, geo_lng, is_connected). The SQL query may involve several parameters, and each parameter may correspond to an entry in the bindings. The local query execution engine 1502 may execute the SQL query by filling in the bindings with their values from user/app context. Context may include, for example, a user's device info or user action context, such as is_connected (e.g., if the Internet is available) or normalized_user_query, etc. In this case the normalized_user_query may be 'ama' and is_connected may be True if the user's device is currently connected to the Internet. In parallel, the same query may trigger an advertisement search. Similar to app-name search, there may be a SQL query as well as bindings, which may be filled in and the query is then executed. In this case, the id may be "ads_search." The query execution engine 1502 may be a component that controls the execution of the different result generating subsystems. The basic flow may be, in response to an event (e.g., a query, swipe up, etc.), select and execute the appropriate query from the local query store 1506, as described above, then process and render the results. Also, it may generate data for the analytics in response to the events and results.

The query execution engine 1502 may be configured to use dynamically updated queries (e.g., SQL queries) and databases/tables. In some cases, there may be an issue, such as a timeout (e.g., slow SQL query), a bad query, or other error in attempting to generate results. To ensure a smooth experience for the user, even when there are errors, there may be a hard-coded minimally functional fallback mechanism. If an error condition occurs, the fallback functionality may be used to provide basic app-name search functionality. Error conditions may include, but are not limited to: timeout/slow query, internal OS error (full storage or other error), SQL error (e.g., either invalid query, invalid/inconsistent bindings, a data-triggered error such as querying for a table or column that does not exist), a result generation error (e.g., failing to check validity of a deeplink), and any unhandled exception or error.

The analytics event processor 1504 may be responsible for receiving loggable event data/errors and ensuring that the analytics data is properly structured and sent to the analytics system 1310 and/or remote service system(s) 106. In the server-based search system 110, any component can generate arbitrary messages and immediately log them locally, which may be captured in the overall system logs. Also, user activity (e.g., all user activity) may be done via a web URL or API request, causing them to automatically be logged. In some cases, the local service module 102 may operate in a partially disconnected mode with bandwidth and privacy limits. User actions may not be knowable by a centralized server, and due to the assumption of limited connectivity and bandwidth, it may not be possible to simply send each loggable message directly to a regular log receiving server. The analytics event processor 1504 may receive data/errors and each event may be aggregated, persisted, or queued, and eventually sent to the analytics system 1310 and/or remote service system 106-6.

The analytics event processor 1504 may perform the following functions: 1) aggregate messages via the different APIs including trackClick, trackFailure, and others, 2) format the messages into the analytics payload, 3) persist the payload when there is no connection, or the allowable bandwidth is used up (e.g., on cellular network as opposed to WiFi), and 4) batch events until allowed to send, such as on specified conditions or events (e.g., device connects to a WiFi and/or the battery is over 75% charge). The analytics event processor 1504 may also perform analytics database updates to ensure that appropriate events are saved into the local analytics (private) database, such as clicks, impressions, and requests. In FIG. 15, the local data module 424-6 may include the analytics event processor 1504 or feed into it. The analytics event processor 1504 may also perform impression tracking and monitor the system state (e.g., WiFi, Cellular-data, no Internet, slow connection, etc.) as well as bandwidth usage. The analytics event processor 1504 may also encrypt/encode the event data to protect against interception, enforce privacy requirements, and ensure no secret information is sent (e.g., using filtering or other rules).

The bundle generation module 1406 may be responsible for collecting fresh server-synced data and building it into a final bundle when the local service module 102 requests one. In the data model that is managed by the bundle generation module 1406, each bundle may include one or more databases that the data manipulation commands within the bundle contents may modify. Example modifications may be defined in SQLite compatible SQL and can include creation of a new SQLite database and migration statements (e.g., commands to create, delete, or alter the schema of tables within the database). New tables may be created, or existing tables can be removed. New indices may also be built. Example modifications may also include data update statements, such as commands to insert, delete, or update rows within tables. Alongside the database's data model, each database may include configuration for how it should be used by the local service module 102. The remote configuration provided can include setting: 1) the SQL queries that should be executed to perform tasks, such as process an app name query, display a relevant ad, or show zero state, 2) refresh interval contracts for the frequency the local service module should get the updated database from the remote service system, and 3) the data version signature that should be included by the local service module upon its next request for a new bundle.

The data that makes up the data update statements for each bundle's database may be populated from one or more data providers. These data providers may interface with other data sources outside of the bundle generation module (e.g., Python and Java services and data stores) and then translate the retrieved data into the SQL commands that are part of the bundle data model.

The bundle generation module 1406 may use the data version signature it received from the local service module 102 to build, for each sub-database, the list of database creation and migration statements that have happened since that data version signature. The bundle generation module 1406 may also run each of the data provider fetch commands and aggregate the data as SQLite SQL commands. The bundle generation module 1406 may also aggregate the minimum and maximum expected refresh intervals that are configured per data provider and set that as the local service module's expected refresh interval. For example, the ads provider may expect minimum refresh intervals of 1 hour and maximum refresh interval of 24 hours. In this example, another provider (e.g., an entities provider) may expect a minimum refresh interval of 6 hours and a maximum refresh interval of 12 hours. In this example, the calculated overall minimum and maximum refresh intervals for that database may be a minimum of 1 hour and a maximum of 12 hours.

To keep local service module updates consistent, a data version signature may be generated for each call to the remote service system 106. This may encode information about the version of database and version of the data provider's fetched data. The signature may be used to generate the migration statements to run for the specific device based on the device's data version signature and compare against the latest database migrations available on the remote service system 106. As an example, assume the signature indicates that the local service module last retrieved "version 5" of the database, and the latest version that the remote service system knows about is "version 8." In this case, the remote service system may combine the commands from "version 6", "version 7", and "version 8" to build a final list of migration statements to run.

The signature may also be used to store metadata about the data provider's state when the local service module last received an update from the remote service system. Some examples of version signature information that may be included for data providers may include device locale information or other relevant changes to the device's state, such as when device locale has changed from English to Hindi, the certain data provider that provided language specific information may want to delete the old data on the device before providing new server synced data in a new language. Another example of version signature information that may be included for data providers may include time of last bundle refresh, which may be used to debounce requests so that it can conserve service capacity if the bundle was already refreshed on the local service module a short time window ago.

In some implementations, the system may implement a lazy-load cache between the bundle request and the bundle server data. If the request is quantized (and rounded to the older time), then there may be a high repetition of requests, so the lazy-load has minimal actual server-back-end requests. As an option, for requests where the last-time was more than a maximum (or for first time requests), the remote service system may send a pre-generated "full data with delete old" bundle.

The server update modules may be subject to bandwidth constraints (e.g., limited to 1 MB of cellular data per day). The bundle generation module 1406 may take as a parameter the max data size. The server update modules may also be configured to "bulk-delete" for "older/last-updated" records. For example, if each row had a "last-touched" version/date, then the bundle generation module 1406 can increase consistency and reduce explicit delete requests by using a timestamp. Likewise, if there is a bandwidth limit, the remote service system can prioritize the most important data. Importance of any entry may be determined by many factors, including the popularity of an app/package or change in score since last update, etc.

The local service module 102 (e.g., shortcuts module 1302) may return application results and/or shortcut results (e.g., deeplinks within applications). In one example, when a user searches for an app (e.g., by a substring query), the local service module 102 may return the application itself, such as a user-selectable icon link that may be selected to open the application. Additionally, or alternatively, the local service module 102 may return shortcuts into applications. A shortcut may refer to a deeplink to an important or popular state or function of an application. For example, if the user searches for "ama", the launcher may return the Amazon Shopping application link (e.g., to open the application to the homepage) along with shortcut deeplinks for "view cart," "past orders," and "popular electronics." As another example, the local service module may return Amazon Music with deeplinks (shortcuts) for "Trending songs," "Personal Playlist," or other links.

In some implementations, the local service module 102 may be configured to handle application name intent queries and include application and shortcut results for identified applications. In the context of on-device app-name search, a use-case may be a user that is looking for an application that they use which is currently installed on their device. Furthermore, the user may expect the result to be found for as little as a single character query. Deciding which app(s) a user is probably looking for, and how likely each app is for a partial-query, may be implemented by the local service module. The local service module app name search implementation may implement the following: 1) consider on-device acquired data (e.g., application name, user-engagement clicks/opens/past-searches, other apps, etc.) for both matching and ranking, 2) consider remote synched data from the remote service system to enhance the matching and ranking of applications, 3) combine developer and remote server sent app-shortcuts, 4) use a fallback in case there are any errors/bugs, and 5) dynamically update (e.g., via a bundle) the on-device search/ranking query (SQLite SQL statement) and dynamically modify the tables generated based on remote synched data.

An example implementation of app intent search functionality that may be provided by the local service module 102 is now described. Initially, the user may enter a query, such as one character or a small number of characters (e.g., 'am'). The on-device local data (e.g., application data) may then be queried for possible matching applications. This may include comparing the user's query to the normalized display name of each application, where the application developer may set the display name. Example application display names may include "Google Maps—Navigation and more" or "mail" (for Samsung E-mail). Comparing the user's query to possible matching applications may include looking for a left-anchored match. For example, normalized app-name starts with query='am' would match an app named "Amazon Shopping." It may also include matching start of middle words, so 'am' may match "Shopping by Amazon" or "Who am I?." It may also match based on removing spaces from the query and the application names, so a user's query of "you tu" would match an application named "youtube." Similarly, a user's query of "eb" could match an application named "e-bay." Other operations may be implemented, including anywhere matching, where "hey" may match an application named "Who Are They" as well as an application named "Hey Duggee Adventures."

The user's normalized query may then be looked up in server synched application data from a received update bundle where it may match many applications, and the matching applications may be checked against the set of installed applications. Server synched data may include alternatives (e.g., "fb"→"Facebook", "pau"→"PayTm"). Server synched data may be built at the remote service system based on aggregate user behaviors, such as if many users type "pau", then correct it to "pay" and then select the PayTm app. Human editors may also generate alternatives. Other algorithms may also be used, such as spell correction, acronym generation, etc.

The set of candidate apps may be the union of the applications matched from locally acquired data and local server synched application data filtered to include installed applications. Candidate apps may be put into buckets/groups. Common features used to group/bucketize apps may include, but are not limited to: 1) recency of engagement (e.g., last 7-days is in bucket B1 and older is in bucket B2), 2) type of match (e.g., starts with is bucket B1, middle word starts—with match is bucket B2 and everything else is bucket B3), and 3) application popularity, where popular applications (e.g., determined by server synched data and/or generated from user-engagement) may be in bucket B1 and less popular applications may be in bucket B2.

Each candidate may then be scored. The score may depend on the group. For example, bucket B1 may be scored based on recency of engagement and B2 may be scored based on popularity of the application. Scoring may utilize both locally acquired data as well as data from the server synched data. The type of match may be considered. For example, "starts with match" may be given a higher score (or put in a better bucket) than a match to the middle of a word. In some cases, the server synched data may specify the "type of match," such as "misspelling", and/or may provide a specific score related to the "type of match." Example factors in scoring may include, but are not limited to: 1) recency of engagement on-device (e.g., last time the user opened the app), 2) recency of installation of the application (e.g., more recently installed applications may rank higher), 3) frequency of engagement (e.g., number of times opened in the past 7 days), 4) time spent using the application (e.g., hours the application was open over past 7 days), 5) application popularity, which may be generated on the remote search system based on aggregate user behavior and may be modified by user location (e.g., the PayPal application may be more popular in the US than in India), 6) query-specific intent score from server synched data, which may be generated based on user-behavior or other data (e.g., "fca"→'facebook' may be a lower score than "fca" to FCA bank, but "fac" →Facebook may have a higher score than "fac"→FCA Bank), and 7) application trendiness score, where a less popular application may be trending, and may get a higher score than an application which is more popular absolutely, but was trending downwards.

Within each group, applications may then be ranked/sorted by score. In some implementations, applications may be filtered out based on features, ranking, etc. In some implementations, for 0 or more applications, application shortcuts may be merged in.

Shortcuts may come from several sources. For example, shortcuts may come from on-device developer (app) generated shortcuts and may include static or dynamic links. For example, if a user opens the Yelp application and searches for a vegetarian restaurant, Yelp may add a shortcut "Vegetarian Restaurants Near Me." Shortcuts may be server-generated in some implementations. Popular, trending, important, and/or personalized shortcuts may be generated on the remote service system 106 and then sent in an update bundle. These may include deeplinks corresponding to actions that are saved or related to user activities. Shortcuts may include user engaged entities/deeplinks. For example, a user may take an action in the search (e.g., search for "bagels"), then click on a Yelp result for "Bagel Barn," where that link may then be treated as a shortcut.

The launcher 1300 may personalize shortcuts in a similar manner as personalizing application search. Personalization may be based on many factors. For example, user-engagement (e.g., both personalized as well as aggregate) shortcuts may be selected, filtered, and/or ranked accordingly. Shortcut ranking/selection may be based on a variety of features, which may include, but are not limited to: 1) the last time a user clicked on the shortcut, 2) the frequency of the user clicking on a shortcut, and 3) how the user engaged with a shortcut. For example, in the Amazon application, if the user searched for shoes then clicked "Nike Shoes," that shortcut may be selected and or boosted next time there is a search for "am." Server synched data regarding shortcut scores may include a popularity score. The score may be a function of aggregate user engagement (absolute or relative). For example, the Amazon shopping shortcut for Nike Shoes may receive a high score if it was clicked on by a large number of users. In another example, the "Start a New Game" shortcut for an application may receive a boost for being clicked on 10 times in the past week. The local service module 102-8 may also consider timeliness, freshness, and trending factors. For example, a recent news article may receive a boost more than news from last week. As another example, popular or trending shortcuts/content may receive a boost over less trendy/popular shortcuts. Shortcuts may be selected and/or scored based on properties of past engagements (e.g., on-device only data may be used here for privacy purposes). For example, if a user frequently clicks on shortcuts with a tag "sports news" in a baseball application, a shortcut from "My Business News App" with a tag "sports news" may receive a boost.

After shortcuts are selected and scored, there may be various ways shortcuts may be included/displayed in the UI (e.g., a launcher or other application UI). In some cases, only shortcuts for the top ranking applications are shown. In some cases, shortcuts may not be shown if more than N applications are matched. For example, a query 'a' which matches 15 apps may not show any shortcuts, but a query for 'amazon', which matches three applications, may show shortcuts. The scores for the shortcuts may determine how many and which shortcuts are shown. For example, the launcher may have a query 'a' which has Amazon Shopping (1st) and Amazing Adventures (2nd) and Amazon Music (3rd) (e.g., maybe ranked by last engagement by the user). If the "resume play of Helter Skelter" for Amazon Music has a score of 100, "Check order status" had a score of 90, and "Nike Shoes" had a score of 25, the launcher may show one shortcut for each of Amazon Shopping and Amazon music.

In some implementations, the local service module 102 may implement zero state functionality (e.g., using the zero state module 1304 FIG. 13). In general, zero state functionality may be implemented without entry of a search query by the user. Put another way, without entering any search query, users may experience zero state functionality in a variety of ways. For example, users may experience zero state functionality as query hints and zero state links. Query hints (i.e., hints) may refer to phrases that, when selected by the user (e.g., touched/clicked), may re-direct the user to the search experience as if the user queried and searched the phrase. Zero state links may include possible search results from the search bar, such as an application shortcut or specific article or page in an application. Clicking a link may re-direct the user to that link's application shortcut or specific article or page in the application. The server may populate and synch the data for zero state functionality, and the local service module 102 (e.g., zero state module 1304) may use local on-device data to personalize what should be displayed to the user. The zero state functionality may be triggered in a variety of ways, such as in the background, on a widget on the screen, in response to a user gesture (e.g., swiping up), the device being idle for a period of time, and/or the screen being on for a period of time without interaction. Triggers for zero state functionality may be referred to herein as "zero state triggers."

Zero state functionality may include a variety of features described hereinafter. In some implementations, zero state functionality may consider on-device data for ranking (e.g., application name, user-engagement including clicks/opens/past-searches, other installed applications, etc.) and consider "remote server (un-personalized)" synched data to enhance the ranking of query hints and zero state links. Zero state functionality may include combined developer and remote-server sent app-shortcuts for zero state links. In some implementations, zero state functionality may dynamically update (e.g., via an update bundle) the on-device search/ranking query (SQLite SQL statement) and dynamically modify the tables generated based on remote server data.

In some implementations, query hints may be synched from the remote service system 106, which may have an unpersonalized list of suggested applications and a suggested query string that will show content for those applications. An example hint may be "zee5 tv shows." If a user clicks on that suggested query, they may be taken to the search integration and shown search results for contents inside of the zee5 application. On device, these example considerations may be used to determine what query hints to display: 1) limit the possible server synced hints to applications that the device currently has installed, 2) boost preference to applications that have recent engagement, 3) if there are 3 or more applications that have hints and have had recent engagement, show a random hint for the 3 most recently used applications, and 4) for any remainder of applications up to 3 total, include a random application and a random hint for that application.

The remote service system 106 may use a variety of sources to populate and create the lists of query hints that may be sent to the local service module 102. For example, the sources may include, but are not limited to: 1) manually curated lists of popular content search queries, 2) manually selected interesting content, 3) automatically generated query hints from the titles of trending content, 4) popular search terms from titles of all content, and 5) personalized hints based on application usage. In a specific example, with respect to personalized hints based on application usage, a user who often opens the Amazon shopping cart may be provided with a hint specific to that action, such as "Amazon—Shopping Cart." As another example, a user that often plays games may be given a hint to "Play a game."

Zero state links may be synched from the remote service system 106, which may have a personalized list of suggested applications and links for those applications, and then combined with on-device information about the application shortcuts to determine a best set of links to show the user on their first interaction. Zero state links may include display data (e.g., image, display title, etc.) and linking information for the user to view and interact with (e.g., select) the content. In this manner, the zero state links may be different than query hints that provide a suggested query string which may require user selection (e.g., touch/click) before seeing content.

The zero state links may be selected for display using one or more of the following example processes on device: 1) limit the possible server synched links to applications that the device currently has installed, 2) combine those server synched links with on device shortcuts that are discovered by the local service module 102, 3) boost preference to applications that have recent engagement, 4) boost preference to links based on the source of the linking information, where possible rankings are preferring remote synched content links over local shortcut links, 5) use the recent engagement and link source preferences to randomly select a few (e.g., 3) applications with 1 link each for the application, and 6) select the applications and or number of results for each application as a function of app popularity, recency of engagement (using on-device private data), frequency of engagement (using on-device private data), and/or popularity of the link/shortcut (e.g., either on-device private data or server aggregated data).

The remote service system 106 may use a variety of sources to populate and create the lists of zero state links that are sent to the local service module 102. Example sources may include, but are not limited to: 1) manually curated lists of popular links, 2) personalized sources for applications that have engagement tracked by analytics, 3) a filtered selection of content results from a content system (e.g., a content Elasticsearch system) used by the search integration, 4) popular trending content, and 5) an active web crawling system.

In some implementations, the local service module 102 (e.g., autosuggest module 1308) may provide autosuggest functionality. Autosuggest may offer query suggestions to a user's current query string. FIG. 17 illustrates an example autosuggest GUI. In some implementations, autosuggest may be run by the remote service system 106 as the user types queries into the search bar. In some implementations, autosuggest may be powered by application knowledge with search content to build the suggested queries. Types of completions may include, but are not limited to: 1) application name completions: "ama"→"amazon", 2) application developer shortcut completions "amazon"→"amazon orders", 3) application navigational shortcut completions "limeroad"→"limeroad women's clothing", 4) application name misspellings "amz"→"amazon", and/or 5) content completions: "covid"→"covid 19".

Autosuggest may be powered by intents application knowledge with search content to build the completions that match the user's query. Intents data may refer to a predicted intent for user app-name intent queries (e.g., 'am' and the user wants Amazon Shopping). The data may be built using monthly active user (MAU) or user behavioral data based on server-interactions. Also, query behavior, such as rewrites, can be used to discover/score new mappings (e.g., "ana"→"ama"→click Amazon Shopping).

Autosuggest in the context of the local service module 102 may consider the user's context and the fact that the user is probably using an app-name search bar. In autosuggest, the user's query may be sent to the remote service system 106 and suggestions may then be made. In some implementations, the local service module 102 may use local data to rerank autosuggest suggestions. In some implementations, autosuggest results may be sent with metadata, such as app-ids, tags, or scores. The local service module 102 may modify ranking based on the user's local data (e.g., show results of type "trending" higher for recently used apps vs. non-recently used apps). Autosuggest may also be modified in several ways, such as: 1) an autosuggest request to the remote service system 106 may include user-context, including lists of recently used apps, 2) autosuggest may also encode the list of applications (e.g., as a Bloom filter) so that actually installed applications are not known/sent but limited personalization at the remote service system 106 is allowed, and/or 3) autosuggest may use remote server knowledge about recent engagements to modify ranking.

The analytics system 1310 and/or remote service system 106 may acquire data sent from the local data module 424 (e.g., the analytics event processor module 1504) and transform the raw data into useful data products that help scale product/business operations. In some implementations, the local service module 102 and the analytics system 1310 may be used in a partially disconnected mode, with bandwidth and privacy limits. In some cases (e.g., due to connectivity), it may not be possible to send each loggable message directly to the analytics system 1310. Additionally, some components may experience call out to remote servers (e.g., autosuggest). This may create multiple disparate data sources to resolve from when doing analytics. In these cases, logs may be merged from a separately maintained and structured product (autosuggest) with logs from the analytics event processor 1504. In some cases, events may not be synchronous. For example, due to poor network and bandwidth constraints, the analytics system 1310 may receive analytics logs about the same event at different times. For example, if a user queries for "flip" at 7:59 pm, it may receive 1 set of logs at 8 pm for the queries "f" and "fl" if that user's network dropped off for 30 minutes starting at 8 pm. After sending those logs, it would receive the messages for "fli" and "flip" sent to the servers at 8:30. The analytics system 1310 may still need to parse these 2 events and reconcile them as part of the same search from the user.

The analytics system 1310 may be responsible for consuming logs emitted by a plurality of components described above and ensuring that these logs are transformed into utilities that allow for analysis of product performance, user engagement, and future product development opportunities in a high-trust, privacy-protecting, self-service fashion. Once data is emitted by each component, including server-based components (e.g., autosuggest) and device-based components (e.g., app-name search or zero state), the analytics system 1310 may siphon it to a centralized data processing unit, where the system automatically: 1) strips any personally identifiable information according to user settings, 2) replaces any device-generated user identifiers with privacy-preserving/protecting user identifiers, ensuring users cannot be re-identified (e.g., by internal employees), and 3) enriches a privacy-protected user identity graph with granular metadata about events completed by the user and derived information about the user. Data about the user can be timestamps of previous impressions/clicks and number of engagements completed in a period of time (e.g., purged according to a schedule). Example events may include purchases, clicks, app opens, and more. The system can store derived information about the user, such as their affinities for certain categories of content, their usage lifecycle stage (e.g., new user vs. power user), their preferences (e.g., their locale, language preference, etc.), and their assigned cohorts and groups (e.g., a Boolean flag that tells if this user received treatment by an experiment). Data may also include which experiment(s) a user was involved with at any given time/time-range (e.g., the App-Name search bundle builder sent experimental-data ID:AN3334 on July 4th, and the normal data was sent on July 8th . . . ).

FIGS. 16-17 illustrate example GUIs that may be generated by an application (e.g., a launcher application) including a local service module and/or receiving data from a local service module. FIG. 16 illustrates example zero state functionality. For example, without entry of a search query in the search query box 1600, the local service module has provided query hints 1602 for "gmail new message" and "chrome web store." Selection of the query hints may result in a search being performed for the queries. In addition to the query hints, the launcher GUI has provided a list of 4 suggested applications: Fake GPS, ExpressVPN, Maps, and Slack. Selection of the suggested application links may launch the application on the user device 100.

FIG. 17 illustrates additional example local service module functionality. In FIG. 17, a user has entered a partial query "ma" into the search query box 1700. In response to the partial query, the local service module has provided autosuggest queries 1702 including: gmail, maps, messages, and mahavitaran. Additionally, the local service module has provided shortcuts to opening the Maps application. In FIG. 17, four example shortcuts 1704 are illustrated. The "Maps" shortcut may open the Maps application to an application homepage. Selection of the other links (e.g., Work, Home, or Directions to Home) may open the Maps application to a specific application page defined by the shortcut link. Additional example shortcuts 1706 into the Gmail application are illustrated. Selection of the Gmail link may open the Gmail application to an application homepage. Selection of the New Message link may open the Gmail application to a state in which a new email message is prepared for drafting. The example shortcut links 1704, 1706 of FIG. 17 may have been provided by the developer and/or determined on the user device 100 (e.g., based on user behavior).

FIG. 18 illustrates an example remote service system 1800 and N groups of user devices 1802-1, 1802-2, . . . , 1802-N (collectively "groups of user devices 1802"). The groups of user devices 1802 may represent user devices associated with different operating systems, different cell carriers, different OEMs, and/or other parties/features. For example, group 1 1802-1 may include devices that execute a first OS (e.g., Android) for a first OEM device (e.g., a first manufacturer). In this example, groups 2-N 1802-2 to 1802-N may include devices that execute the first OS (e.g., Android) for other OEMs (e.g., other manufacturers).

Local service modules 1804 in an initial configuration (e.g., "initial local service modules") may be provided to the different device groups 1802 prior to, or after, customer acquisition, as described herein. In some implementations, the same initial local service modules including the same functionality may be provided to the different groups of user devices 1802. In other implementations, different initial local service modules with different functionality may be provided to the groups of user devices 1802. In some cases, the groups of user devices 1802 may provide the same general functionality (e.g., search and advertisement), but include modules (e.g., search/ad modules) that provide the functionality using different algorithms and/or data.

In some cases, the remote service system 1800 may provide the same updates to the groups of user devices, such that the different groups of devices may execute local service modules with the same functionality over time. In some cases, the remote service system 1800 may provide different updates to the different groups of devices. In these cases, the functionality provided by the different groups of devices may differ, even in cases where the groups may have started with the same initial local service modules. In some cases, the updates may include updates for the same general functionality (e.g., search and advertisement), but provide different algorithms and/or data.

In some implementations, the remote service system 1800 may maintain siloed data for different groups of devices and/or functionalities (e.g., Group 1-N Data 1806-1, 1806-2, . . . , 1806-N). In some implementations, the remote service system 1800 may share data across device groups and functionalities (e.g., shared data 1808). For example, search data acquired at the remote service system 1800 from a plurality of devices from different groups may be shared and used to update the search functionality in the different groups. Sharing data across different device groups may benefit devices from each of the different groups. For example, shared search data (or other data) across device groups may enhance search functionality (e.g., search relevance) for each of the individual groups, as the shared data may provide additional insights into aggregate user search behavior and expectations (e.g., expected results for different queries). In a specific example, the shared search data may help improve search algorithms used by the groups of devices. Other shared data may also help improve other functionality of the local service modules. For example, shared advertisement data (e.g., ad performance data) may help improve advertisement selection algorithms for advertisement functionality.

The data structures (e.g., search records and advertisement records) and data stores described herein are only example data structures and data stores. As such, the devices and systems described herein may implement the techniques of the present disclosure using additional/alternative data structures and data stores.

Modules and data stores included in the systems and devices represent features that may be included in the systems and devices of the present disclosure. The modules and data stores described herein may be embodied by electronic hardware, software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein may be realized by common electronic hardware and software components. In some implementations, the features associated with the one or more modules and data stores depicted herein may be realized by separate electronic hardware and software components.

The modules and data stores may be embodied by electronic hardware and software components including, but not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

The one or more processing units may include one or more central processing units (CPUs), graphics processing units (GPUs), digital signal processing units (DSPs), or other processing units. The one or more processing units may be configured to communicate with memory components and I/O components. For example, the one or more processing units may be configured to communicate with memory components and I/O components via the interconnect components.

A memory component (e.g., main memory and/or a storage device) may include any volatile or non-volatile media. For example, memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology (e.g., compact disc, digital versatile disc, and/or Blu-ray Disc), or any other memory components.

Memory components may include (e.g., store) data described herein. For example, the memory components may include the data included in the data stores. Memory components may also include instructions that may be executed by one or more processing units. For example, memory may include computer-readable instructions that, when executed by one or more processing units, cause the one or more processing units to perform the various functions attributed to the modules and data stores described herein.

The I/O components may refer to electronic hardware and software that provides communication with a variety of different devices. For example, the I/O components may provide communication between other devices and the one or more processing units and memory components. In some examples, the I/O components may be configured to communicate with a computer network. For example, the I/O components may be configured to exchange data over a computer network using a variety of different physical connections, wireless connections, and protocols. The I/O components may include, but are not limited to, network interface components (e.g., a network interface controller), repeaters, network bridges, network switches, routers, and firewalls. In some examples, the I/O components may include hardware and software that is configured to communicate with various human interface devices, including, but not limited to, display screens, keyboards, pointer devices (e.g., a mouse), touchscreens, speakers, and microphones. In some examples, the I/O components may include hardware and software that is configured to communicate with additional devices, such as external memory (e.g., external HDDs).

In some implementations, systems may include one or more computing devices that are configured to implement the techniques described herein. Put another way, the features attributed to the modules and data stores described herein may be implemented by one or more computing devices. Each of the one or more computing devices may include any combination of electronic hardware, software, and/or firmware described above. For example, each of the one or more computing devices may include any combination of processing units, memory components, I/O components, and interconnect components described above. The one or more computing devices of the systems may also include various human interface devices, including, but not limited to, display screens, keyboards, pointing devices (e.g., a mouse), touchscreens, speakers, and microphones. The computing devices may also be configured to communicate with additional devices, such as external memory (e.g., external HDDs).

The one or more computing devices of the systems may be configured to communicate with the network 120. The one or more computing devices of the systems may also be configured to communicate with one another (e.g., via a computer network). In some examples, the one or more computing devices of the systems may include one or more server computing devices configured to communicate with user devices. The one or more computing devices may reside within a single machine at a single geographic location in some examples. In other examples, the one or more computing devices may reside within multiple machines at a single geographic location. In still other examples, the one or more computing devices of the systems may be distributed across a number of geographic locations.

What is claimed is:

1. A user device comprising:
   memory configured to:
     store a local service module application including initial search records and an initial search function, wherein each initial search record includes an application link that opens an application page, wherein each initial search record includes search data that describes the application page associated with the initial search record, and wherein the initial search function is configured to select from the initial search records; and
   a processing unit configured to execute the local service module application, wherein executing the local service module application causes the processing unit to:
     request search update data from a remote system;
     receive the search update data from the remote system, wherein the search update data includes updated search records and an updated search function configured to select from the updated search records;
     update the initial search records and the initial search function with the updated search records and the updated search function, respectively, wherein the initial search function and the updated search function include an initial scoring software component and an updated scoring software component, respectively, wherein the updated scoring software component is different than the initial scoring software component, and wherein the initial scoring software component and the updated scoring component are configured to generate relevance scores for the initial search records and the updated search records;
     receive a search query from a requesting application installed on the user device;
     select a set of updated search records based on the search query using the updated search function; and
     provide a search response to the requesting application, wherein the search response includes application links from the selected set of updated search records.

2. The user device of claim 1, wherein the updated scoring function software component is configured to generate relevance scores for the updated search records based on matches between the search query and search data in the updated search records.

3. The user device of claim 1, wherein the updated scoring software component is configured to generate relevance scores based on which applications are installed on the user device.

4. The user device of claim 3, wherein the updated scoring software component is configured to generate relevance scores based on application usage data that indicates an amount of usage associated with the applications that are installed on the user device.

5. The user device of claim 1, wherein the updated scoring software component is configured to generate relevance scores for the updated search records based on scoring features included in the updated search records.

6. The user device of claim 1, wherein executing the local service module application causes the processing unit to:
  determine that the updated search function is not functioning properly in response to detection of an error associated with the updated search function; and
  revert back to using the initial search function in response to determining that the updated search function is not functioning properly.

7. The user device of claim 6, wherein the error includes detection of an exception.

8. The user device of claim 6, wherein detection of the error is based on an amount of time elapsed during selection of the set of updated search records.

9. The user device of claim 1, wherein the memory is configured to store initial advertisement records, wherein each initial advertisement record includes initial advertisement content and initial targeting parameters that indicate when to select the initial advertisement content, and wherein executing the local service module application causes the processing unit to:
  request advertisement update data from the remote system; and
  receive the advertisement update data from the remote system, wherein the advertisement update data includes updated advertisement records that each include updated advertisement content and updated targeting parameters.

10. The user device of claim 9, wherein executing the local service module application causes the processing unit to:
  select an updated advertisement record based on satisfaction of updated targeting parameters associated with the selected updated advertisement record; and
  provide updated advertisement content from the selected updated advertisement record to the requesting application.

11. The user device of claim 10, wherein the updated targeting parameters include a list of one or more installed applications on the user device.

12. The user device of claim 10, wherein the updated targeting parameters include targeting parameters associated with the search query.

13. The user device of claim 10, wherein the updated targeting parameters include targeting parameters associated with the search response.

14. The user device of claim 9, wherein executing the local service module application causes the processing unit to provide advertisement content to additional applications installed on the user device.

15. The user device of claim 1, wherein the initial search function includes initial instructions that at least one of identify and score the initial search records, and wherein the updated search function includes updated instructions that at least one of identify and score the updated search records.

16. A non-transitory computer-readable medium comprising computer-executable instructions, the computer-executable instructions causing a processing unit of a user device to:
  store initial search records and an initial search function, wherein each initial search record includes an application link that opens an application page, wherein each initial search record includes search data that describes the application page associated with the initial search record, and wherein the initial search function is configured to select from the initial search records;
  request search update data from a remote system;
  receive the search update data from the remote system, wherein the search update data includes updated search records and an updated search function configured to select from the updated search records;
  update the initial search records and the initial search function with the updated search records and the updated search function, respectively, wherein the initial search function and the updated search function include an initial scoring software component and an updated scoring software component, respectively, wherein the updated scoring software component is different than the initial scoring software component, and wherein the initial scoring software component and the updated scoring component are configured to generate relevance scores for the initial search records and the updated search records;
  receive a search query from a requesting application installed on the user device;
  select a set of updated search records based on the search query using the updated search function; and
  provide a search response to the requesting application, wherein the search response includes application links from the selected set of updated search records.

17. The non-transitory computer-readable medium of claim 16, wherein the updated scoring software component is configured to generate relevance scores for the updated search records based on matches between the search query and search data in the updated search records.

18. The non-transitory computer-readable medium of claim 16, wherein the updated scoring software component is configured to generate relevance scores based on which applications are installed on the user device.

19. The non-transitory computer-readable medium of claim 18, wherein the updated scoring software component is configured to generate relevance scores based on application usage data that indicates an amount of usage associated with the applications that are installed on the user device.

20. The non-transitory computer-readable medium of claim 16, wherein the updated scoring software component is configured to generate relevance scores for the updated search records based on scoring features included in the updated search records.

21. The non-transitory computer-readable medium of claim 16, wherein the processing unit is configured to:
  determine that the updated search function is not functioning properly in response to detection of an error associated with the updated search function; and
  revert back to using the initial search function in response to determining that the updated search function is not functioning properly.

22. The non-transitory computer-readable medium of claim 21, wherein the error includes detection of an exception.

23. The non-transitory computer-readable medium of claim 21, wherein detection of the error is based on an amount of time elapsed during selection of the set of updated search records.

24. The non-transitory computer-readable medium of claim 16, wherein the processing unit is configured to:
store initial advertisement records, wherein each initial advertisement record includes initial advertisement content and initial targeting parameters that indicate when to select the initial advertisement content;
request advertisement update data from the remote system; and
receive the advertisement update data from the remote system, wherein the advertisement update data includes updated advertisement records that each include updated advertisement content and updated targeting parameters.

25. The non-transitory computer-readable medium of claim 24, wherein the processing unit is configured to:
select an updated advertisement record based on satisfaction of updated targeting parameters associated with the selected updated advertisement record; and
provide updated advertisement content from the selected updated advertisement record to the requesting application.

26. The non-transitory computer-readable medium of claim 25, wherein the updated targeting parameters include a list of one or more installed applications on the user device.

27. The non-transitory computer-readable medium of claim 25, wherein the updated targeting parameters include targeting parameters associated with the search query.

28. The non-transitory computer-readable medium of claim 25, wherein the updated targeting parameters include targeting parameters associated with the search response.

29. The non-transitory computer-readable medium of claim 24, wherein the processing unit is configured to provide advertisement content to additional applications installed on the user device.

30. The non-transitory computer-readable medium of claim 16, wherein the initial search function includes initial instructions that at least one of identify and score the initial search records, and wherein the updated search function includes updated instructions that at least one of identify and score the updated search records.

* * * * *